(12) United States Patent
Mallik et al.

(10) Patent No.: US 10,687,288 B2
(45) Date of Patent: Jun. 16, 2020

(54) SYNCHRONIZATION ACROSS TRANSMITTING NODES USING SHARED RADIO FREQUENCY SPECTRUM

(71) Applicant: QUALCOMM Incorporated, San Diego, CA (US)

(72) Inventors: Siddhartha Mallik, San Diego, CA (US); Jing Sun, San Diego, CA (US); Xiaoxia Zhang, San Diego, CA (US); Taesang Yoo, Riverside, CA (US); Yongbin Wei, La Jolla, CA (US); Onkar Jayant Dabeer, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 625 days.

(21) Appl. No.: 15/403,862

(22) Filed: Jan. 11, 2017

(65) Prior Publication Data

US 2017/0223739 A1 Aug. 3, 2017

Related U.S. Application Data

(60) Provisional application No. 62/290,174, filed on Feb. 2, 2016.

(51) Int. Cl.
*H04W 56/00* (2009.01)
*H04W 16/14* (2009.01)
*H04W 74/08* (2009.01)

(52) U.S. Cl.
CPC ......... *H04W 56/001* (2013.01); *H04W 16/14* (2013.01); *H04W 74/0808* (2013.01); *H04W 74/0891* (2013.01)

(58) Field of Classification Search
None
See application file for complete search history.

(56) References Cited

U.S. PATENT DOCUMENTS

2015/0099525 A1 4/2015 Ji et al.
2015/0110012 A1 4/2015 Bhushan et al.
(Continued)

FOREIGN PATENT DOCUMENTS

EP 3145264 A1 3/2017
WO WO-2015174437 A1 11/2015
WO WO-2015187282 A1 12/2015

OTHER PUBLICATIONS

3GPP, "3rd Generation Partnership Project; Technical Specification Group Radio Access Network; Study on Licensed-Assisted Access to Unlicensed Spectrum (Release 13)", 3GPP Technical Report, Jun. 18, 2015, 87 pgs, 3GPP TR 36.889, V13.0.0, XP050965916, 3rd Generation Partnership Project, Mobile Competence Centre, 650, Route Des Lucioles, F-06921 Sophia-Antipolis, Valbonne, France [retrieved on Jun. 18, 2015].
(Continued)

*Primary Examiner* — Kodzovi Acolatse
(74) *Attorney, Agent, or Firm* — Holland & Hart LLP

(57) ABSTRACT

Techniques for synchronization across transmitting nodes of a same public land mobile network (PLMN) operator using a shared radio frequency spectrum band may include initiating, at a first wireless node, a listen-before-talk (LBT) procedure for access to the shared radio frequency spectrum band, and identifying that a second wireless node associated with a same PLMN operator as the first wireless node has won contention for the shared radio frequency spectrum band. The first wireless node may discontinue the LBT procedure and initiate an auxiliary transmission using the shared radio frequency spectrum band concurrently with a primary transmission of the second wireless node.

30 Claims, 19 Drawing Sheets

(56) References Cited

U.S. PATENT DOCUMENTS

| | | | | |
|---|---|---|---|---|
| 2016/0338104 A1* | 11/2016 | Yin | .................. | H04W 72/0446 |
| 2017/0041951 A1* | 2/2017 | Yin | .................. | H04W 74/0808 |
| 2017/0094584 A1* | 3/2017 | Salem | .................. | H04W 16/14 |
| 2017/0094681 A1* | 3/2017 | Takeda | .................. | H04W 16/14 |
| 2017/0142751 A1* | 5/2017 | Liu | ...................... | H04L 5/1415 |
| 2018/0124611 A1* | 5/2018 | Moon | .................. | H04W 16/14 |
| 2018/0324604 A1* | 11/2018 | Yang | ................ | H04W 74/0808 |
| 2019/0069303 A1* | 2/2019 | Yerramalli | ........ | H04W 72/0413 |
| 2019/0320452 A1* | 10/2019 | Zhang | .................. | H04W 74/04 |

OTHER PUBLICATIONS

China Unicom, "Discussion on Backoff Counter Design for LAA Frequency Reuse," 3GPP TSG RAN WG1 Meeting #82bis, R1-155998, Malmo, Sweden, Oct. 5-9, 2015, 3 pgs., XP051002767, 3rd Generation Partnership Project, Mobile Competence Centre, 650, Route Des Lucioles, F-06921 Sophia-Antipolis, Cedex, France.

Nokia Networks, "On LAA DL LBT Design Enabling Frequency Reuse," 3GPP TSG RAN WG1 Meeting #83, R1-157130, Anaheim, USA, Nov. 15-22, 2015, 5 pgs., XP051003397, 3rd Generation Partnership Project, Mobile Competence Centre, 650, Route Des Lucioles, F-06921 Sophia-Antipolis, Cedex, France.

ISA/EPO, Partial International Search Report of the International Searching Authority, Int' l. App. No. PCT/US2017/013238, dated Apr. 24, 2017, European Patent Office, Rijswijk, NL, 16 pgs.

ISA/EP, International Search Report and Written Opinion of the International Searching Authority, Int'l Application No. PCT/US2017/013238, dated Jul. 6, 2017, European Patent Office, Rijswijk, NL, 23 pgs.

* cited by examiner

SYNCHRONIZATION ACROSS TRANSMITTING NODES USING SHARED RADIO FREQUENCY SPECTRUM

CROSS REFERENCES

The present application for patent claims priority to U.S. Provisional Patent Application No. 62/290,174 by Mallik, et al., entitled "Synchronization Across Transmitting Nodes using Shared Radio Frequency Spectrum," filed Feb. 2, 2016, and assigned to the assignee hereof, the entirety of which is hereby expressly incorporated by reference herein for any and all purposes.

BACKGROUND

The following relates generally to wireless communication, and more specifically to synchronization across transmitting nodes using a shared radio frequency spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

Some modes of communication may enable communication between a base station and a UE in a shared radio frequency spectrum band, or in different radio frequency spectrum bands (e.g., in a licensed radio frequency spectrum band and a shared radio frequency spectrum band) of a cellular network. However, in contrast to a carrier in a licensed radio frequency spectrum band, which may be allocated for use by the devices of one public land mobile network (PLMN) and be available to a base station or a UE of the PLMN at predetermined (or all) times, a carrier in a shared radio frequency spectrum band may be available for use by the devices of the PLMN intermittently. This intermittent availability may be a result of contention for access to the carrier of the shared radio frequency spectrum band, between devices of the PLMN, devices of one or more other PLMNs, and/or other devices (e.g., Wi-Fi devices). For some radio frames, a device of a PLMN may win contention for access to a carrier in the shared radio frequency spectrum band, while for other radio frames, the device may not win contention for access to the carrier in the shared radio frequency spectrum band.

In some contention-based systems, a base station or UE may perform a listen-before-talk (LBT) procedure to contend for access to the shared radio frequency spectrum band. An LBT procedure may include performing a clear channel assessment (CCA) procedure to determine whether a channel of the shared radio frequency spectrum band is available. When it is determined that the channel of the shared radio frequency spectrum band is available, a channel reservation signal (e.g., a channel usage beacon signal (CUBS)) may be transmitted to reserve the channel. When it is determined that the channel is not available, a CCA procedure may be performed for the channel again at a later time.

Because of the intermittent availability of carriers in a shared radio frequency spectrum band, base stations and UEs may use techniques that provide fairness in coexistence with other users of the shared radio frequency spectrum band, and that still provide reliable communications. For example, such techniques may include transmitting some information or types of radio frames using the dedicated radio frequency spectrum band and transmitting other information (e.g., lower priority information) or radio frames using the shared radio frequency spectrum band. Such techniques may be referred to as License-Assisted Access (LAA).

When different base stations of a same PLMN operator transmit over a dedicated radio frequency spectrum band in parallel, the transmission frequency used by a first base station in a first cell may, in some cases, be reused by other base stations in other cells. The rate at which a same frequency may be used in a network may be referred to as the frequency reuse rate. Some Long Term Evolution (LTE) or LTE-Advanced (LTE-A) networks may have a frequency reuse rate of one and operate in a "reuse one" mode. Frequency reuse may enhance the overall efficiency of a network by allowing additional transmissions between base stations and UEs. In systems that operate using a shared radio frequency spectrum band, enhanced frequency reuse may be desirable in order to enhance overall system efficiency.

SUMMARY

The present disclosure, for example, relates to wireless communication systems, and more particularly to enhanced frequency reuse through synchronization across transmitting nodes using a shared radio frequency spectrum band. In some cases, it may be desirable to provide frequency reuse in a wireless network, which may allow multiple base stations or user equipment (UE) to concurrently transmit using the same transmission frequency. Various aspects of the present disclosure provide techniques for synchronization across transmitting nodes of a same public land mobile network (PLMN) operator using a shared radio frequency spectrum band. In some examples, a first wireless node may initiate a listen-before-talk (LBT) procedure for access to the shared radio frequency spectrum band, and identify that a second wireless node associated with a same PLMN operator as the first wireless node has won contention for the shared radio frequency spectrum band. The first wireless node may discontinue the LBT procedure and initiate an auxiliary transmission using the shared radio frequency spectrum band concurrently with a primary transmission of the second wireless node.

In some examples, the first wireless node may synchronize the auxiliary transmission with an LBT frame of the primary transmission. In some examples, the first wireless node may identify a synchronization beacon from the second wireless node operator, complete an abbreviated LBT procedure, and transmit an auxiliary pilot signal concurrently with a primary pilot signal of the second wireless node. The first wireless node may receive feedback from one or more associated receivers (e.g., a UE that receives transmissions from the first wireless node), and may adjust a transmission rate of the auxiliary transmission based on the feedback. Similarly, the second wireless node may receive feedback from one or more of its associated receivers, and may adjust a transmission rate of the primary transmission based on the feedback. The feedback may include, for example, channel state information (CSI) feedback that may provide an indication of interference from the other transmitting wireless node, which may be used to select a modulation and coding scheme (MCS) for subsequent transmissions of the LBT frame.

A method of wireless communication is described. The method may include identifying, at a first wireless node, a set of other wireless nodes that are associated with the first wireless node, initiating an LBT procedure at the first wireless node for a shared radio frequency (RF) spectrum band, discontinuing the LBT procedure based at least in part on detecting a second wireless node of the set of other wireless nodes transmitting an LBT frame, and transmitting, by the first wireless node, an auxiliary transmission using the shared RF spectrum band concurrently with a transmission of the detected second wireless node.

An apparatus for wireless communication is described. The apparatus may include means for identifying, at a first wireless node, a set of other wireless nodes that are associated with the first wireless node, means for initiating an LBT procedure at the first wireless node for a shared RF spectrum band, means for discontinuing the LBT procedure based at least in part on detecting a second wireless node of the set of other wireless nodes transmitting an LBT frame, and means for transmitting, by the first wireless node, an auxiliary transmission using the shared RF spectrum band concurrently with a transmission of the detected second wireless node.

A further apparatus is described. The apparatus may include a processor, memory in electronic communication with the processor, and instructions stored in the memory. The instructions may be operable to cause the processor to identify, at a first wireless node, a set of other wireless nodes that are associated with the first wireless node, initiate an LBT procedure at the first wireless node for a shared RF spectrum band, discontinue the LBT procedure based at least in part on detecting a second wireless node of the set of other wireless nodes transmitting an LBT frame and transmit, by the first wireless node, an auxiliary transmission using the shared RF spectrum band concurrently with a transmission of the detected second wireless node.

A non-transitory computer readable medium for wireless communication is described. The non-transitory computer-readable medium may include instructions to cause a processor to identify, at a first wireless node, a set of other wireless nodes that are associated with the first wireless node, initiate an LBT procedure at the first wireless node for a shared RF spectrum band, discontinue the LBT procedure based on detecting a second wireless node of the set of other wireless nodes transmitting an LBT frame and transmit, by the first wireless node, an auxiliary transmission using the shared RF spectrum band concurrently with a transmission of the detected second wireless node.

Some examples of the method, apparatus, or non-transitory computer-readable medium described above may further include processes, features, means, or instructions for adjusting one or more parameters of a subsequent LBT procedure performed at the first wireless node based on the auxiliary transmission.

In some examples of the method, apparatus, or non-transitory computer-readable medium described above, the one or more parameters comprise one or more of a contention window parameter or a counter parameter associated with the subsequent LBT procedure. In some examples of the method, apparatus, or non-transitory computer-readable medium described above, the one or more parameters comprise an upper bound for a contention window that is selected to be larger than an upper bound that would be selected in an absence of the auxiliary transmission.

In some examples of the method, apparatus, or non-transitory computer-readable medium described above, the one or more parameters comprise a lower bound for a contention window that is selected to be larger than a lower bound that would be selected in an absence of the auxiliary transmission.

In some examples of the method, apparatus, or non-transitory computer-readable medium described above, the adjusting comprises determining a time duration of the auxiliary transmission. Some examples of the method, apparatus, or non-transitory computer-readable medium described above may further include processes, features, means, or instructions for resuming the discontinued LBT procedure when the time duration is less than a threshold time value. Some examples of the method, apparatus, or non-transitory computer-readable medium described above may further include processes, features, means, or instructions for initiating a new LBT procedure when the time duration is equal to or greater than the threshold time value.

In some examples of the method, apparatus, or non-transitory computer-readable medium described above, a contention window for the new LBT procedure is selected based on the time duration of the auxiliary transmission. In some examples of the method, apparatus, or non-transitory computer-readable medium described above, a contention window for the new LBT procedure is selected based on a number of wireless nodes having transmissions that are detected at the first wireless node.

In some examples of the method, apparatus, or non-transitory computer-readable medium described above, the identifying the set of other wireless nodes comprises: identifying one or more other wireless nodes associated with a same operator as an operator of the first wireless node. Some examples of the method, apparatus, or non-transitory computer-readable medium described above may further include processes, features, means, or instructions for including one or more of the other wireless nodes associated with the same operator in the set of other wireless nodes based on one or more coexistence parameters.

In some examples of the method, apparatus, or non-transitory computer-readable medium described above, the including one or more of the other wireless nodes associated with the same operator in the set of other wireless nodes based on the one or more coexistence parameters comprises: identifying a first number of wireless nodes having transmissions that are detected at the first wireless node. Some examples of the method, apparatus, or non-transitory computer-readable medium described above may further include processes, features, means, or instructions for identifying a second number of wireless nodes having transmissions that are detected at the second wireless node. Some examples of the method, apparatus, or non-transitory computer-readable medium described above may further include processes, features, means, or instructions for including the second wireless node in the set of other wireless nodes based on the first number of wireless nodes and the second number of wireless nodes.

In some examples of the method, apparatus, or non-transitory computer-readable medium described above, the second wireless node is included in the set of other wireless nodes when the second number of wireless nodes exceeds the first number of wireless nodes. In some examples of the method, apparatus, or non-transitory computer-readable medium described above, the one or more coexistence parameters comprises a probability parameter, and where including one or more of the other wireless nodes associated with the same operator in the set of other wireless nodes is based on the probability parameter.

In some examples of the method, apparatus, or non-transitory computer-readable medium described above, the probability parameter is adjusted to provide a higher probability of including the second wireless node in the set of other wireless nodes when the second number of wireless nodes exceeds the first number of wireless nodes. In some examples of the method, apparatus, or non-transitory computer-readable medium described above, the one or more coexistence parameters comprises an energy detection threshold.

Some examples of the method, apparatus, or non-transitory computer-readable medium described above may further include processes, features, means, or instructions for providing information related to other wireless nodes detected by the first wireless node with one or more wireless nodes of the set of other wireless nodes. Some examples of the method, apparatus, or non-transitory computer-readable medium described above may further include processes, features, means, or instructions for receiving information related to other wireless nodes detected by one or more wireless nodes of the set of other wireless nodes.

In some examples of the method, apparatus, or non-transitory computer-readable medium described above, the providing and receiving are performed using wireless transmissions between nodes of the set of other wireless nodes. In some examples of the method, apparatus, or non-transitory computer-readable medium described above, the providing and receiving are performed using wired connections between nodes of the set of other wireless nodes.

In some examples of the method, apparatus, or non-transitory computer-readable medium described above, the providing and receiving are performed using one or more periodic beacon signals transmitted between nodes of the set of other wireless nodes. In some examples of the method, apparatus, or non-transitory computer-readable medium described above, the discontinuing further comprises: detecting an LBT frame preamble of the second wireless node. Some examples of the method, apparatus, or non-transitory computer-readable medium described above may further include processes, features, means, or instructions for identifying the second wireless node as being included in the set of other wireless nodes based on the LBT frame preamble.

In some examples of the method, apparatus, or non-transitory computer-readable medium described above, the discontinuing further comprises: determining that the second wireless node allows auxiliary transmissions during the LBT frame. In some examples of the method, apparatus, or non-transitory computer-readable medium described above, the determining that the second wireless node allows auxiliary transmissions during the LBT frame comprises: determining whether an auxiliary transmission prohibited flag is set by the second wireless node.

In some examples of the method, apparatus, or non-transitory computer-readable medium described above, the discontinuing further comprises: detecting a synchronization beacon from the second wireless node, the synchronization beacon indicating one or more timing parameters for the LBT frame transmitted by the detected second wireless node. In some examples of the method, apparatus, or non-transitory computer-readable medium described above, the transmitting the auxiliary transmission comprises transmitting an auxiliary transmission pilot signal that is synchronized with a primary transmission pilot signal of the LBT frame transmitted by the detected second wireless node.

In some examples of the method, apparatus, or non-transitory computer-readable medium described above, transmitting the auxiliary transmission further comprises: transmitting, after detecting the synchronization beacon, a CUBS. Some examples of the method, apparatus, or non-transitory computer-readable medium described above may further include processes, features, means, or instructions for transmitting the auxiliary transmission pilot signal after the CUBS.

In some examples of the method, apparatus, or non-transitory computer-readable medium described above, transmitting the auxiliary transmission further comprises: transmitting, after detecting the synchronization beacon, the auxiliary transmission pilot signal. Some examples of the method, apparatus, or non-transitory computer-readable medium described above may further include processes, features, means, or instructions for transmitting the CUBS after the auxiliary transmission pilot signal.

In some examples of the method, apparatus, or non-transitory computer-readable medium described above, transmitting the auxiliary transmission further comprises: precoding the auxiliary transmission pilot signal according to a precoding that is to be used for data transmissions of the auxiliary transmission.

In some examples of the method, apparatus, or non-transitory computer-readable medium described above, may further include processes, features, means, or instructions for adjusting a transmission rate of the auxiliary transmission based at least in part on a primary transmission pilot signal of the LBT frame transmitted by the detected second wireless node.

In some examples of the method, apparatus, or non-transitory computer-readable medium described above, the adjusting comprises: receiving CSI feedback from one or more receivers of the auxiliary transmission of the LBT frame. Some examples of the method, apparatus, or non-transitory computer-readable medium described above may further include processes, features, means, or instructions for selecting a modulation and coding (MCS) scheme based on the CSI feedback.

A method of wireless communication is described. The method may include transmitting a synchronization beacon signal from a primary wireless node using an unlicensed RF spectrum band, the synchronization beacon signal indicating one or more timing parameters for a primary transmission of an LBT frame, monitoring for a signal from an auxiliary wireless node indicating that the auxiliary wireless node intends to transmit an auxiliary transmission using the shared RF spectrum band concurrently with the primary transmission of the LBT frame, and adjusting a transmission rate of the primary transmission of the LBT frame based at least in part on the signal from the auxiliary wireless node.

An apparatus for wireless communication is described. The apparatus may include means for transmitting a synchronization beacon signal from a primary wireless node using an unlicensed RF spectrum band, the synchronization beacon signal indicating one or more timing parameters for a primary transmission of an LBT frame, means for monitoring for a signal from an auxiliary wireless node indicating that the auxiliary wireless node intends to transmit an auxiliary transmission using the shared RF spectrum band concurrently with the primary transmission of the LBT frame and means for adjusting a transmission rate of the primary transmission of the LBT frame based at least in part on the signal from the auxiliary wireless node.

A further apparatus is described. The apparatus may include a processor, memory in electronic communication with the processor, and instructions stored in the memory. The instructions may be operable to cause the processor to transmit a synchronization beacon signal from a primary wireless node using an unlicensed RF spectrum band, the synchronization beacon signal indicating one or more timing parameters for a primary transmission of an LBT frame, monitor for a signal from an auxiliary wireless node indicating that the auxiliary wireless node intends to transmit an auxiliary transmission using the shared RF spectrum band concurrently with the primary transmission of the LBT frame and adjust a transmission rate of the primary transmission of the LBT frame based at least in part on the signal from the auxiliary wireless node.

A non-transitory computer readable medium for wireless communication is described. The non-transitory computer-readable medium may include instructions to cause a processor to transmit a synchronization beacon signal from a primary wireless node using an unlicensed RF spectrum band, the synchronization beacon signal indicating one or more timing parameters for a primary transmission of an LBT frame, monitor for a signal from an auxiliary wireless node indicating that the auxiliary wireless node intends to transmit an auxiliary transmission using the shared RF spectrum band concurrently with the primary transmission of the LBT frame and adjust a transmission rate of the primary transmission of the LBT frame based on the signal from the auxiliary wireless node.

Some examples of the method, apparatus, or non-transitory computer-readable medium described above may further include processes, features, means, or instructions for performing, before transmitting the synchronization beacon signal, an LBT procedure to gain access to the unlicensed RF spectrum band.

In some examples of the method, apparatus, or non-transitory computer-readable medium described above, the adjusting comprises: receiving CSI feedback from one or more receivers of the primary transmission of the LBT frame. Some examples of the method, apparatus, or non-transitory computer-readable medium described above may further include processes, features, means, or instructions for selecting an MCS scheme based on the CSI feedback.

In some examples of the method, apparatus, or non-transitory computer-readable medium described above, the signal from the auxiliary wireless node is a channel usage beacon signal (CUBS), and the method further comprises: transmitting a primary wireless node pilot signal using the unlicensed RF spectrum band that is synchronized with an auxiliary wireless node pilot signal. In some examples of the method, apparatus, or non-transitory computer-readable medium described above, transmitting the primary wireless node pilot signal further comprises: precoding the primary wireless node pilot signal according to a precoding that is to be used for data transmissions of the primary transmission of the LBT frame.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
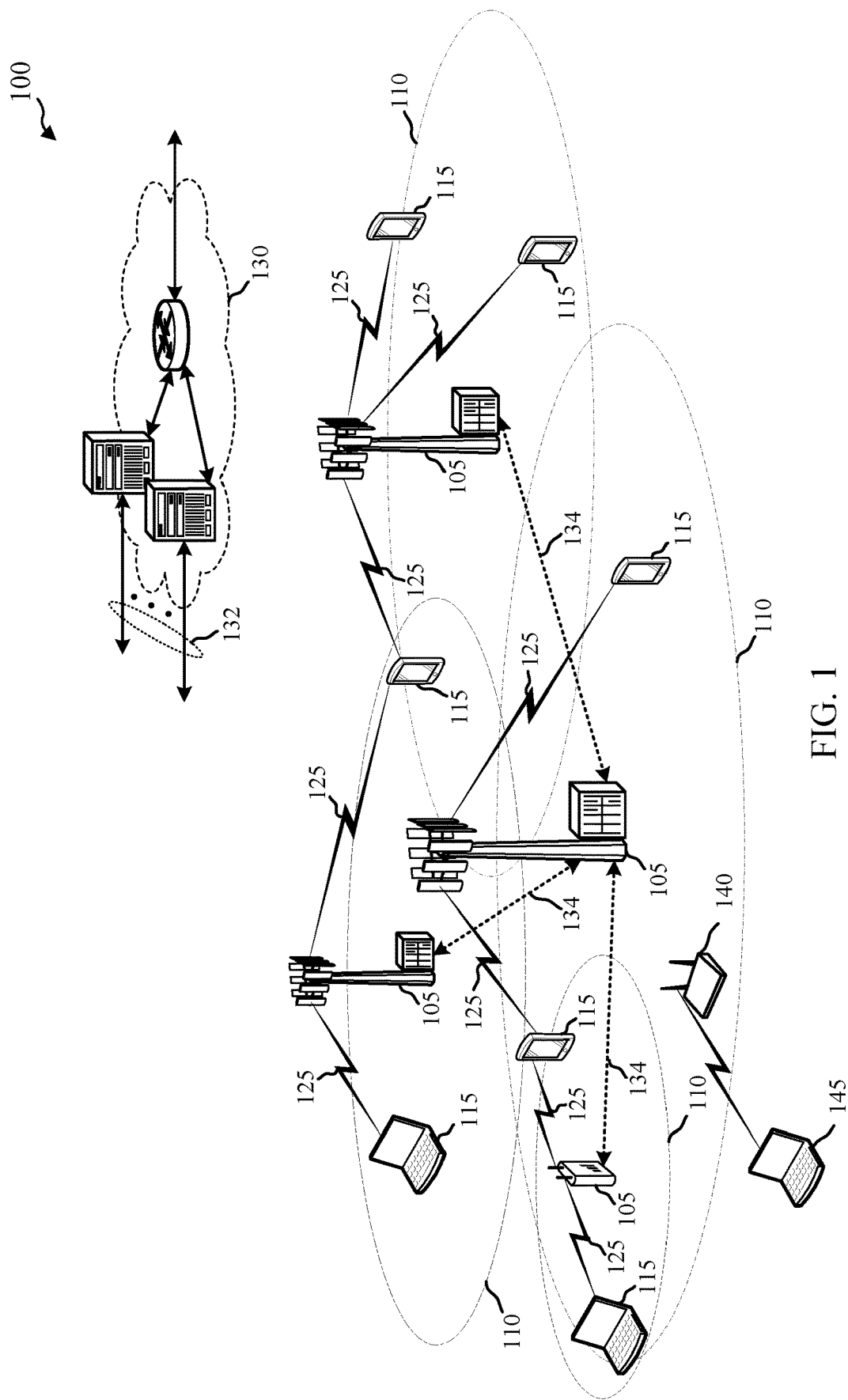
FIG. 1 illustrates an example of a wireless communications system that supports synchronization across transmitting nodes using a shared radio frequency spectrum in accordance with aspects of the present disclosure.

The present disclosure provides techniques for synchronization across transmitting nodes using a shared radio frequency spectrum band, which may enable enhanced frequency reuse by the transmitting nodes and thereby enhance network efficiency. In some deployments, when different base stations of a same public land mobile network (PLMN) operator transmit or receive over a shared radio frequency spectrum band in parallel, the base stations may operate in a reuse one mode when their listen-before-talk (LBT) radio frame timings are synchronized and each transmitting base station wins contention for access to the shared radio frequency spectrum band. In such deployments, when the LBT radio frame timings of the base stations are not synchronized, frequency reuse may not be used and unsynchronized base stations may contend for channel access separately from other base stations of the same PLMN operator. Thus, in some cases, different nodes of a same operator may compete with each other for access to the shared radio frequency spectrum band until the LBT frames of the different nodes become synchronized, which may occur at certain identified times (e.g., at identified LBT frame or superframe boundaries). Various aspects of the present disclosure provide for synchronization techniques that may allow a wireless node to perform a fast synchronization with a detected LBT frame transmission of another wireless node of the same operator.

In some examples, a first wireless node may initiate an LBT procedure for access to the shared radio frequency spectrum band, and identify that a second wireless node associated with a same PLMN operator as the first wireless node has won contention for the shared radio frequency spectrum band. The first wireless node may discontinue the LBT procedure and initiate an auxiliary transmission using the shared radio frequency spectrum band concurrently with a primary transmission of the second wireless node. In some examples, the first wireless node may identify a synchronization beacon from the second wireless node operator, complete an abbreviated LBT procedure, and transmit an auxiliary pilot signal concurrently with a primary pilot signal of the second wireless node. The first wireless node may receive feedback from one or more associated receivers (e.g., a user equipment (UE) that receives transmissions from the first wireless node), and may adjust a transmission rate of the auxiliary transmission based on the feedback. Similarly, the second wireless node may receive feedback from one or more of its associated receivers, and may adjust a transmission rate of the primary transmission based on the feedback. The feedback may include, for example, channel state information (CSI) feedback that may provide an indication of interference from the other transmitting wireless node, which may be used to select a modulation and coding scheme (MCS) for subsequent transmissions of the LBT frame.

In some examples, the shared radio frequency spectrum band may be used for Long Term Evolution (LTE)/LTE-Advanced (LTE-A) communications and may be shared with devices that operate according to different radio access technologies (RATs), such as Wi-Fi devices that operate according to IEEE 802.11 standards, for example. The shared radio frequency spectrum band may be used in combination with, or independent from, a licensed radio frequency spectrum band. The licensed radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may contend for access using LBT procedures (e.g., a radio frequency spectrum band that is available for unlicensed use, such as Wi-Fi use, a radio frequency spectrum band that is available for use by different RATs, or a radio frequency spectrum band that is available for use by multiple operators in an equally shared or prioritized manner).

Aspects of the disclosure are initially described in the context of a wireless communication system that uses a shared radio frequency spectrum band and LBT procedures for accessing the shared radio frequency spectrum band. Aspects of the disclosure are further illustrated by and described with reference to apparatus diagrams, system diagrams, and flowcharts that relate to synchronization techniques for wireless transmissions of multiple wireless nodes using a shared radio frequency spectrum band.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE/LTE-A network that operates, at least in part, using a shared radio frequency spectrum band. Base stations 105 and UEs 115 may use synchronization techniques as discussed herein to provide enhanced frequency reuse in the shared frequency spectrum band, and thereby provide enhanced utilization of the shared frequency spectrum band.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

In some examples, base stations 105 and UEs 115 may be associated with a first operator, such as a PLMN operator. As illustrated in FIG. 1, some examples may also be a second operator transmitting node such as first Wi-Fi node 140 (e.g., a Wi-Fi access point) and a second operator receiving node such as a receiving Wi-Fi node 145 (e.g., a Wi-Fi station) that may operate within a coverage area 110. The first Wi-Fi node 140 and receiving Wi-Fi node 145 may be, for example, Wi-Fi nodes that operate using at least a portion of the shared radio frequency spectrum band. In some examples, other nodes that use the shared radio frequency spectrum band may be LTE/LTE-A nodes of a different PLMN operator, instead of, or in addition to, other Wi-Fi nodes. Thus, the first Wi-Fi node 140 and receiving Wi-Fi node 145 may compete for access to one or more channels of the shared radio frequency spectrum band with base stations 105 and UEs 115.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, a UE 115 or base station 105 may operate in a shared or unlicensed frequency spectrum. These devices may perform an LBT procedure such as a clear channel assessment (CCA) prior to communicating in order to determine whether the channel is available. A CCA may include an energy detection procedure to determine whether there are any other active transmissions. For example, the device may infer that a change in a received signal strength indication (RSSI) of a power meter indicates that a channel is occupied. Specifically, signal power that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence.

A base station 105 may gather channel condition information from a UE 115 in order to efficiently configure and schedule the channel. This information may be sent from the UE 115 in the form of a channel state report. A channel state report may contain a rank indicator (RI) requesting a number of layers to be used for downlink transmissions (e.g., based on the antenna ports of the UE 115), a precoding matrix indicator (PMI) indicating a preference for which precoder matrix should be used (based on the number of layers), and a channel quality indicator (CQI) representing the highest modulation and coding scheme (MCS) that may be used.

CQI may be calculated by a UE 115 after receiving predetermined pilot symbols such as cell-specific reference signals (CRS) or channel state information reference signals (CSI-RS). RI and PMI may be excluded if the UE 115 does not support spatial multiplexing (or is not in support spatial mode). The types of information included in the report determines a reporting type. Channel state reports may be periodic or aperiodic. That is, a base station 105 may configure a UE 115 to send periodic reports at regular intervals, and may also request additional reports as needed. Aperiodic reports may include wideband reports indicating the channel quality across an entire cell bandwidth, UE selected reports indicating a selected subset of the subbands, or configured reports in which the subbands reported are selected by the base station 105.

In some cases, wireless communications system 100 may utilize one or more enhanced component carriers (eCCs). An eCC may be characterized by one or more features including: flexible bandwidth, different transmission time intervals (TTIs), and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum). An eCC characterized by flexible bandwidth may include one or more segments that may be utilized by UEs 115 that are not capable of monitoring the whole bandwidth or prefer to use a limited bandwidth (e.g., to conserve power).

In some cases, an eCC may utilize a different TTI length than other component carriers (CCs), which may include use of a reduced or variable symbol duration as compared with TTIs of the other CCs. The symbol duration may remain the same, in some cases, but each symbol may represent a distinct TTI. In some examples, an eCC may support transmissions using different TTI lengths. For example, some CCs may use uniform 1 ms TTIs, whereas an eCC may use a TTI length of a single symbol, a pair of symbols, or a slot. In some cases, a shorter symbol duration may also be associated with increased subcarrier spacing. In conjunction with the reduced TTI length, an eCC may utilize dynamic time division duplex (TDD) operation (i.e., it may switch from downlink to uplink operation for short bursts according to dynamic conditions.)

As indicated above, in some examples UEs 115 and base stations 105 may employ frequency reuse based on synchronized LBT radio frames transmitted between UEs 115 and base stations 105. Thus, synchronized base stations 105 and UEs 115 may concurrently transmit on a same transmission frequency. Such concurrent transmissions may result in interference between the concurrent transmissions, and transmission rates of the concurrent transmissions may be selected to provide receivers of the transmissions with enhanced likelihood of successfully receiving their respective transmissions. For example, a transmitting base station 105 may use an MCS that is selected based on interference levels of one or more other concurrently transmitting base stations 105 at an intended receiving UE 115. In some examples, as will be discussed in more detail herein, a base station 105 may not be synchronized with other base stations 105, and may perform a fast synchronization on a frame-by-frame basis that may enable frequency reuse for a particular LBT frame.

Figure 2:
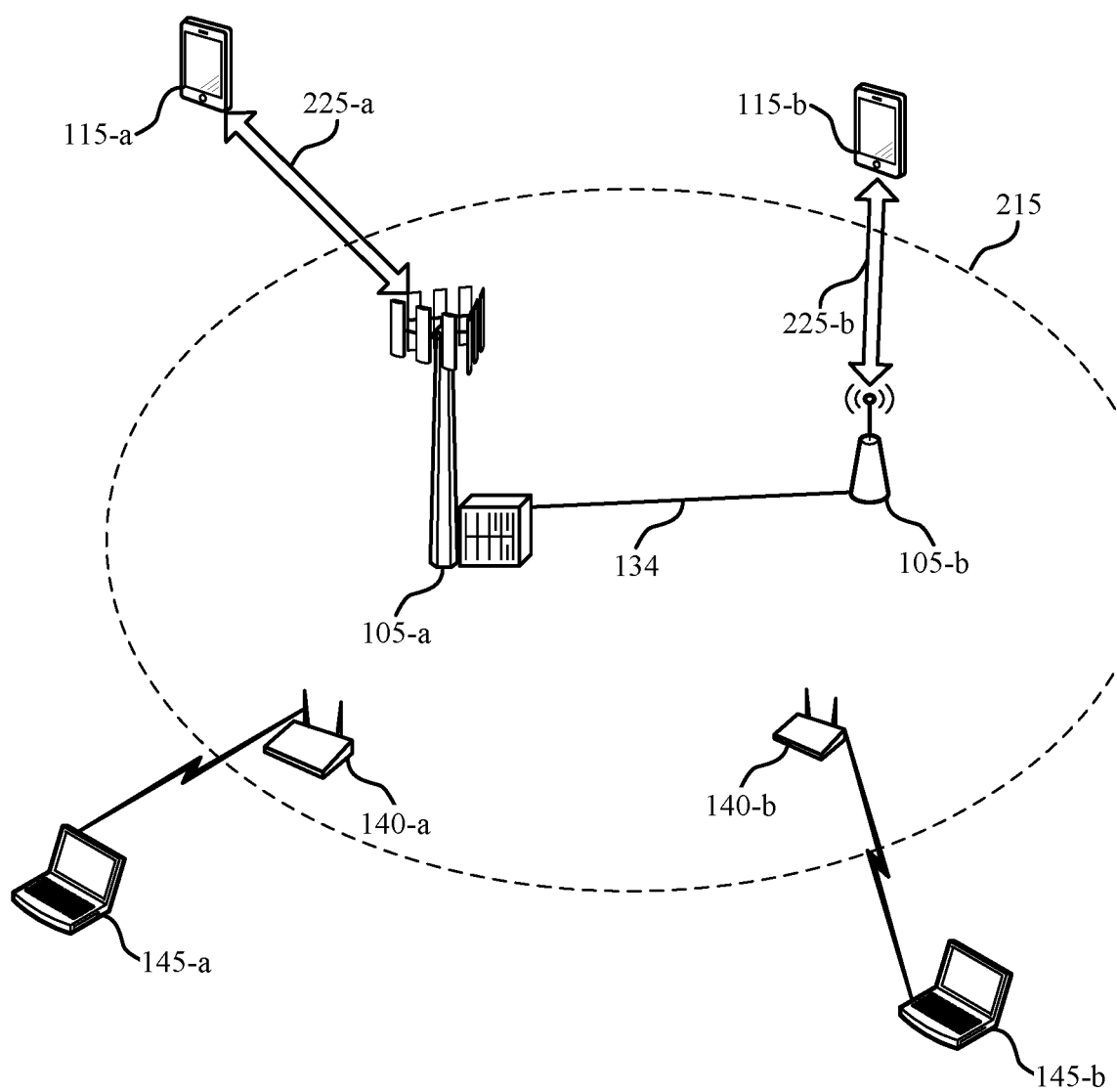
FIG. 2 illustrates an example of a wireless communications system that supports synchronization across transmitting nodes using a shared radio frequency spectrum in accordance with aspects of the present disclosure.

FIG. 2 illustrates an example of a wireless communications system 200 for synchronization across transmitting nodes using a shared radio frequency spectrum. Wireless communications system 200 may include first base station 105-a, second base station 105-b, first UE 115-a, and second UE 115-b, which may be examples of the corresponding devices described with reference to FIG. 1. Base stations 105 and UEs 115 may all be wireless nodes of a first operator (e.g., a first PLMN operator), and in some examples may be referred to as eCC or License-Assisted Access (LAA) nodes. In some aspects, one or more wireless nodes of a second operator may be present within or adjacent to coverage area 215 of base stations 105. In the example of FIG. 2, first Wi-Fi node 140-a and second Wi-Fi node 140-b may be within coverage area 215, and may communicate with Wi-Fi node 145-a and 145-b, respectively.

In some examples of the wireless communications system 200, first base station 105-a and first UE 115-a may communicate using first communications link 225-a, which may provide for both uplink and downlink communications. Similarly, second base station 105-b and second UE 115-b may communicate using second communications link 225-b. Base stations 105 also may be connected through backhaul link 134-a, which may be an example of backhaul link 134 of FIG. 1. The communications links 225, in some examples, may transmit waveforms between the base stations 105 and the respective UEs 115 using one or more component carriers that may include orthogonal frequency division multiple access (OFDMA) waveforms, single carrier frequency division multiple access (SC-FDMA) waveforms, or resource block interleaved frequency division multiple access (FDMA) waveforms, for example. The communications links 225 may be associated with a frequency in the shared radio frequency spectrum band. It should be understood that this example is presented for illustrative purposes and there may be other similar modes of operation or deployment scenarios that provide LTE/LTE-A communication in a shared radio frequency spectrum band.

In some examples, base station 105-*a* may be deployed in a residential, small business, medium business, or enterprise environment, and may allow UEs 115 to establish connections using shared radio frequency spectrum band(s). Such a deployment may allow UEs 115 to operate using shared radio frequency spectrum band and reduce data usage provided through licensed radio frequency spectrum bands, which may help reduce costs for users. In some examples, base stations 105 and UEs 115 may include hardware for both licensed spectrum access as well as shared spectrum access.

As discussed above, when using shared radio frequency spectrum, the base stations 105 and UEs 115 may perform LBT procedures to determine that the shared radio frequency spectrum is available for transmission. As also discussed above, base stations 105 and UEs 115 may concurrently transmit using frequency reuse techniques on synchronized LBT frames. However, in the event that first base station 105-*a* and second base station 105-*b* are not synchronized (e.g., if second base station 105-*b* receives new data for transmission to second UE 115-*b* or if second base station 105-*b* failed a prior CCA), second base station 105-*b* may need to contend for access to the shared radio frequency spectrum band with each of first base station 105-*a* and Wi-Fi nodes 140. Various aspects of the present disclosure provide techniques for second base station 105-*b* to synchronize with first base station 105-*a* during an LBT frame, and allow for frequency reuse between the base stations 105 during the LBT frame rather than having second base station 105-*b* separately contend for channel access or wait until a subsequent synchronization opportunity (e.g., a superframe boundary).

In some examples, second base station 105-*b* may use such techniques to perform an opportunistic transmission of an auxiliary LBT frame concurrently with a primary LBT frame of first base station 105-*a*. In some examples, second base station 105-*b* may initiate an LBT procedure (e.g., a CCA procedure to obtain access to the shared radio frequency spectrum band), and may detect an LBT frame of first base station 105-*a* transmitted in the interval [t, t+T), in which T is an LBT frame duration and t is a time at which the LBT frame of first base station 105-*a* is detected. Upon detecting the LBT frame of first base station 105-*a*, second base station 105-*b* may transmit an auxiliary LBT frame in the interval [$t_s$, t+T), where t≤$t_s$≤t+T, provided that the LBT procedure has cleared slots in the time interval [t−$\Delta t_{PIFS}$, $t_s$), where $\Delta t_{PIFS}$>0 and may be selected based on one or more abbreviated LBT parameters associated with an auxiliary transmission.

Such an auxiliary transmission, in some examples, may not require second base station 105-*b* to complete the entire LBT procedure (e.g., a CCA counter of second base station 105-*b* may not count down to zero prior to starting the auxiliary transmission). In such instances, second base station 105-*b* may concurrently transmit with first base station 105-*a* using a same transmission frequency, thus providing frequency reuse between the base stations 105. In some examples, as will be discussed in more detail below, one or more rate prediction techniques may be employed by first base station 105-*a* to adjust a data rate for the primary transmission so as to account for additional interference from the auxiliary transmission. In some examples, auxiliary transmissions may be disabled for nodes within an energy detection (ED) threshold of −62 dm, as an auxiliary transmission in such cases may cause strong interference to the primary transmission. In some examples, when second base station 105-*b* detects the first base station 105-*a* transmission, it may abort a current LBT procedure and begin an auxiliary or abbreviated LBT procedure that may have a contention window selected to provide fair access to the shared radio frequency spectrum band. In some examples, the auxiliary LBT procedure may have an energy detection threshold that is adjusted to subtract energy associated with the transmission of first base station 105-*a*.

Figure 3:
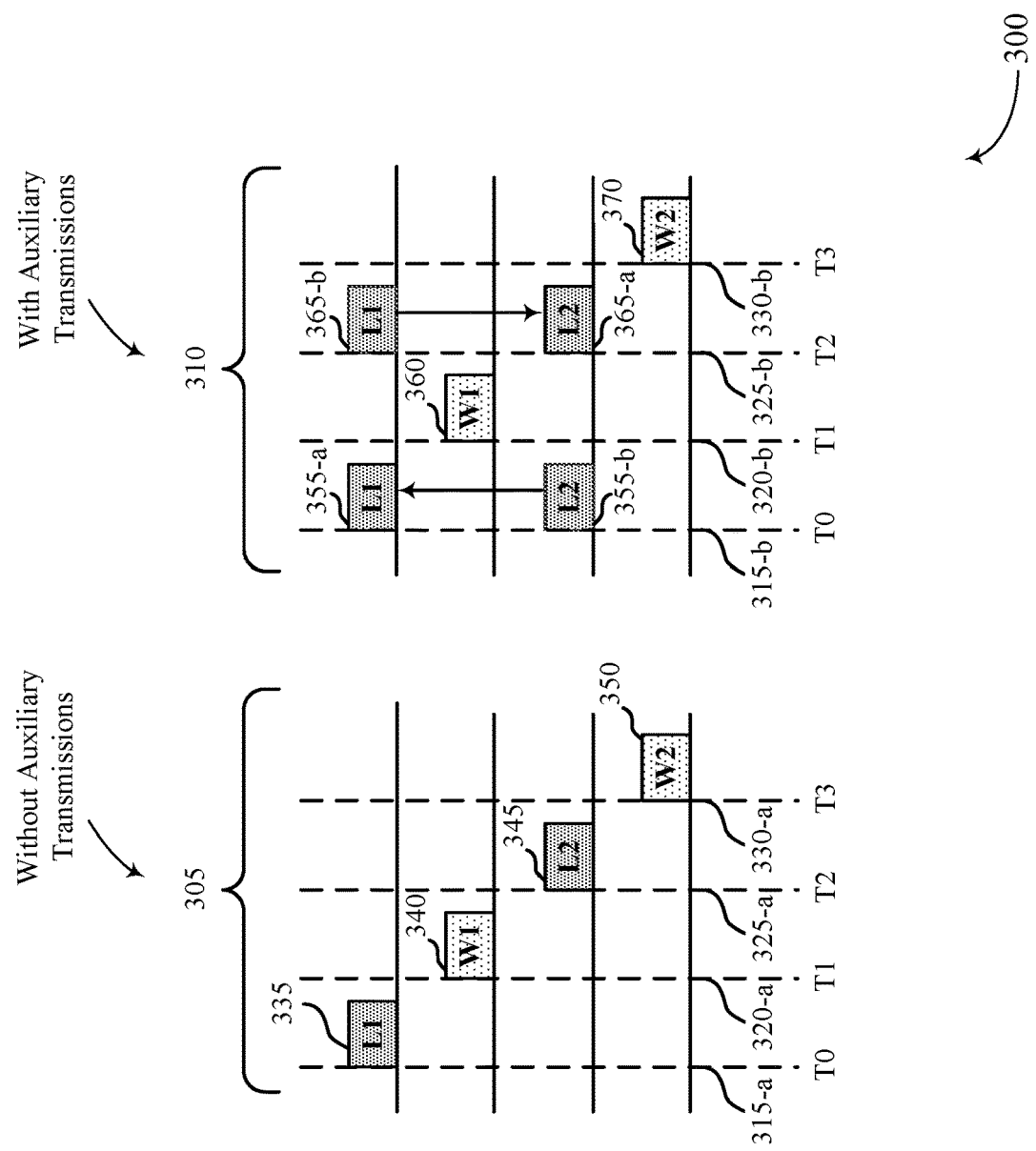
FIG. 3 illustrates an example of wireless transmissions in which an auxiliary transmission may be transmitted concurrently with a primary transmission of synchronized transmitting nodes using a shared radio frequency spectrum in accordance with aspects of the present disclosure.
Figure 3:
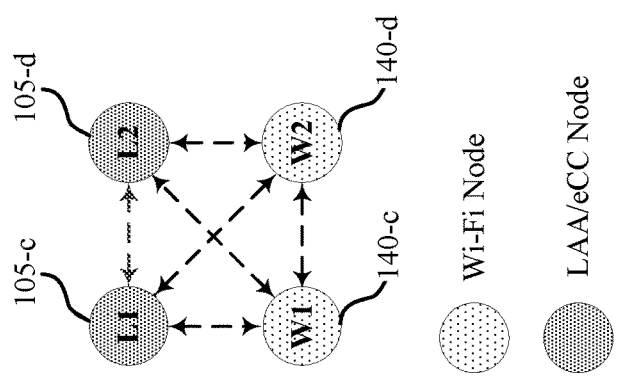

FIG. 3 illustrates an example of wireless transmissions 300 in which an auxiliary transmission may be transmitted concurrently with a primary transmission of synchronized transmitting nodes using a shared radio frequency spectrum in accordance with aspects of the present disclosure. In some cases, wireless transmissions 300 may represent aspects of techniques performed by a UE 115 or base station 105 as described with reference to FIGS. 1-2. In the example of FIG. 3, first base station 105-*c* and second base station 105-*d*, which may be examples of eCC/LAA wireless nodes, may transmit and receive transmissions from one or more UEs (e.g., UEs 115 of FIGS. 1-2) using a shared radio frequency spectrum band. While the example of FIG. 3 illustrates base stations 105 as eCC/LAA wireless nodes, in other examples one or more of the eCC/LAA nodes may be a UE. First Wi-Fi node 140-*c* and a second Wi-Fi node 140-*d* may be in proximity to the base stations 105 such that each of the base stations 105 and Wi-Fi nodes 140 are within a range such that if one is transmitting the remainder will not pass the LBT procedure (e.g., each of the devices 105, 140 may be within a preamble detection (PD) range of one another), as indicated by the broken lines connecting the devices 105, 140.

In some examples, first base station 105-*c*, second base station 105-*d*, first Wi-Fi node 140-*c*, and second Wi-Fi node 140-*d* may each transmit independent transmissions without any auxiliary transmissions as indicated in first example 305, in which at initial time T0 315-*a*, first base station 105-*c* may send transmission 335 following a successful LBT procedure. Second base station 105-*d* and Wi-Fi nodes 140 may also perform LBT procedures, which may not be successful due to first base station 105-*c* transmitting. At subsequent time T1 320-*a*, first Wi-Fi node 140-*c* may send transmission 340 following a successful LBT procedure. At time T2 325-*a*, second base station 105-*d* may send transmission 345, followed at time T3 330-*a* by transmission 350 sent by second Wi-Fi node 140-*d*. Thus, in this first example 305, each of the base stations 105 and Wi-Fi nodes 140 is provided with equal access to the shared radio frequency spectrum band through LBT procedures.

As indicated above, in some examples first base station 105-*c* and second base station 105-*d* may be associated with a same operator, which may enable frequency reuse in the event that first base station 105-*c* and second base station 105-*d* transmit with synchronized LBT frames. In the first example 305, first base station 105-*c* and second base station 105-*d* may be unsynchronized and thus frequency reuse may not be used. As indicated above, in some examples a base station 105 may detect that another base station associated with the same operator may be transmitting an LBT frame and perform a fast synchronization to the detected LBT frame. In a second example 310, second base station 105-*d* may detect initial transmission 355-*a* of first base station 105-*c* at time T0 315-*b*. Such a detection may be made by second base station 105-*d* during its LBT procedure, for example. Upon detecting initial transmission 355-*a*, second base station 105-*d* may synchronize to the LBT frame of initial transmission 355-*a* and transmit auxiliary transmission 355-*b* during initial transmission 355-*a*, indicated by the arrow from auxiliary transmission 355-*b* to initial transmission 355-a. At time period T1 320-b, first Wi-Fi node 140-c may send transmission 360, which both base stations 105 may detect and thus not transmit. At time period T2 325-b, again second base station 105-d may win contention for the shared radio frequency spectrum band, and may send transmission 365-a which may be a primary transmission during the time period starting at T2 325-b. First base station 105-c, having recently won contention at time T0 315-b, may have a contention window that expires after second base station 105-d starts transmission 365-a. First base station 105-c may detect transmission 365-a, determine that second base station 105-d is associated with the same operator, synchronize to an LBT frame that is transmitted in transmission 365-a, and transmit transmission 365-b as an auxiliary transmission to transmission 365-a. At time period T3 330-b, second Wi-Fi node 140-d may send transmission 370, which both base stations 105 may detect and thus not transmit.

Thus, in such examples, wireless resources of the shared radio frequency spectrum band may be used for both primary and auxiliary transmissions by both first base station 105-c and second base station 105-d, thus enhancing the use of the shared radio frequency spectrum band. In some examples, a data rate for the primary and auxiliary transmissions may be reduced relative to a data rate that could have been supported in the absence of the other transmission, but the combined data rate of both the primary and auxiliary transmissions may provide an overall increase in the amount of data transferred. For example, if first base station 105-c could support a data transmission rate of 750 Mbit/s in the absence of an auxiliary transmission, and a data transmission rate of 500 Mbit/s with auxiliary transmission, frequency reuse results in a net benefit so long as the auxiliary transmission provides a data transmission rate that is greater than 250 Mbit/s. In some examples, a base station 105 that initiates an auxiliary transmission may do so in the event that it determines that an amount data to be transmitted exceeds a data threshold value and an estimated data transmission rate exceeds a rate threshold value.

In some examples, following an auxiliary transmission, such as auxiliary transmission 355-b of second base station 105-d, second base station 105-d may determine one or more parameters for a subsequent LBT procedure based on auxiliary transmission 355-b. As indicated above, in some examples second base station 105-d may discontinue its LBT procedure, and in some examples may suspend a counter associated with the LBT procedure. In the subsequent LBT procedure, second base station 105-d may simply resume the counter, or may determine an new value for a counter based on one or more factors associated with auxiliary transmission 355-b. For example, if a relatively large amount of time was left on the LBT counter, and auxiliary transmission 355-b occupied a relatively large amount of the LBT frame, the LBT counter may be reset to have a relatively large value. In other examples, the LBT counter value may be selected based on a number of Wi-Fi nodes 140 detected by second base station 105-d. In further examples, such an LBT counter may have a value determined based on a random selection from a contention window which may be bounded, for example, by an amount of time remaining on the suspended LBT counter and an upper contention window value based on established LBT rules. In some examples, the upper contention window value may be increased based on auxiliary transmission 355-b.

Figure 4:
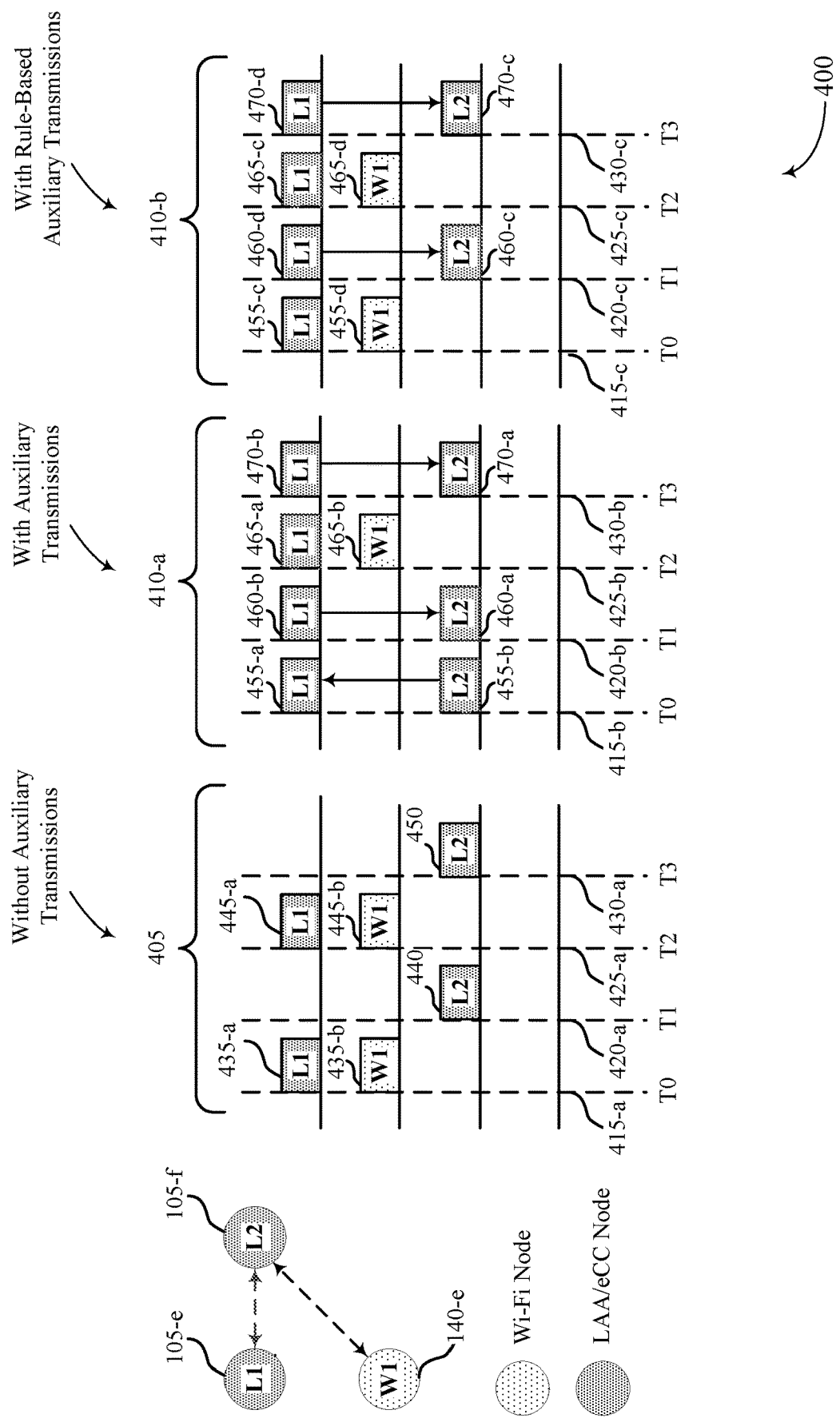
FIG. 4 illustrates another example of wireless transmissions in which an auxiliary transmission may be transmitted concurrently with a primary transmission of synchronized transmitting nodes using a shared radio frequency spectrum in accordance with aspects of the present disclosure.

FIG. 4 illustrates an example of wireless transmissions 400 in which an auxiliary transmission may be transmitted concurrently with a primary transmission of synchronized transmitting nodes using a shared radio frequency spectrum in accordance with aspects of the present disclosure. In some cases, wireless transmissions 400 may represent aspects of techniques performed by a UE 115 or base station 105 as described with reference to FIGS. 1-2. In the example of FIG. 4, first base station 105-e and second base station 105-f, which may be examples of eCC/LAA wireless nodes, may transmit and receive transmissions from one or more UEs (e.g., UEs 115 of FIGS. 1-2) using a shared radio frequency spectrum band. While the example of FIG. 4 illustrates base stations 105 as eCC/LAA wireless nodes, in other examples one or more of the eCC/LAA nodes may be a UE 115. Wi-Fi node 140-e may be in PD range of second base station 105-f, as indicated by the broken line connecting Wi-Fi node 140-e and second base station 105-f. Wi-Fi node 140-a may not, however, be in PD range of first base station 105-e, and thus transmissions of Wi-Fi node 140-e may not result in an LBT procedure failure at first base station 105-e.

In a first example 405, first base station 105-e at time T0 415-a may transmit transmission 435-a, concurrently with transmission 435-b of Wi-Fi node 140-e based on each device passing its LBT procedure for accessing the shared radio frequency spectrum band. At time T1 420-a, second base station 105-f may transmit transmission 440. At time T2 425-a, first base station 105-e and Wi-Fi node 140-e may again each pass their LBT procedure, and first base station 105-e may transmit transmission 445-a and Wi-Fi node 140-e may concurrently transmit transmission 445-b. At time T3 430-a second base station 105-f may again pass its LBT procedure and transmit transmission 450. Thus, in this first example 405, each of base stations 105 and Wi-Fi nodes 140 is provided with two transmission opportunities using the shared radio frequency spectrum band through LBT procedures.

In the event that first base station 105-e and second base station 105-f employ synchronization techniques and frequency reuse as illustrated in example 410-a, Wi-Fi node 140-e may have reduced transmission opportunities. In the example 410-a, second base station 105-f may synchronize with first base station 105-e at time T0 415-b, and transmit auxiliary transmission 455-b. At times T1 420-b and T3 430-b, first base station 105-e may synchronize with second base station 105-f and transmit auxiliary transmissions 460-b and 470-b, respectively. Because Wi-Fi node 140-e is within PD range of second base station 105-f, auxiliary transmission 455-b may prevent Wi-Fi node 140-e from successfully performing an LBT procedure at time T0 415-b. In such a case, Wi-Fi node 140-e may transmit transmission 465-b at time T2 425-b, and Wi-Fi node 140-e has reduced transmission opportunities relative to the transmission opportunities of first example 405.

In order to provide fair channel access to Wi-Fi node 140-e in such situations, various examples may provide co-existence parameters, or rule-based auxiliary transmissions, that base stations 105 may use when determining whether auxiliary transmissions may be used. In some examples, such rule-based auxiliary transmissions may include a probability factor that a base station 105 may use to reduce the likelihood that an auxiliary transmission may be performed. Such a probability factor may be established through setting of a contention window for an LBT procedure for an auxiliary transmission. As indicated above, in some examples a base station 105 may discontinue an LBT procedure upon detecting a primary transmission of another base station 105. In some examples, the base station 105 attempting the auxiliary transmission may have to pass the LBT procedure for a reduced amount of time prior to beginning the auxiliary transmission. In examples that use a probability factor, a contention window may be selected to provide a higher probability of a longer auxiliary transmission LBT counter. In other examples, an energy detection threshold for the auxiliary LBT procedure may be adjusted to a relatively low value such that nearly any energy detected in the LBT procedure will result in a failure of the LBT procedure.

In further examples, base stations 105 may determine a set of other nodes that are detectable at the base station 105, and may transmit an auxiliary transmission if the set of other nodes detectable at the auxiliary transmission node is empty or is a subset of the set of other nodes detectable at the primary transmission node. In such a case, because the primary transmission node cleared the LBT procedure, the auxiliary transmission will not preclude one of the other nodes from transmitting. Such an example is provided in FIG. 4 at example 410-b. In this example, a first set of detectable other nodes at first base station 105-e is empty, and a second set of detectable other nodes at second base station 105-e includes Wi-Fi node 140-e. Thus, first base station 105-e may transmit auxiliary transmissions 460-d and 470-d at times T1 420-c and T3 430-c, but second base station 105-f may not transmit auxiliary transmissions because the second set of detectable nodes is not a subset of the first set of detectable nodes. Accordingly, in example 410-b, Wi-Fi node 140-e has the same number of transmission opportunities as it would have in the absence of any auxiliary transmissions by the base stations 105. In some examples, the base stations 105 may exchange information on the sets of detectable nodes, such as through over-the-air communications (e.g., included in a synchronization beacon or in a CUBS transmission) or via back-haul connections (e.g., an X2 connection). In some examples, the sets of detectable nodes may be updated dynamically (e.g., on a time scale of tens of LBT frames) using information on detected preambles.

Figure 5:
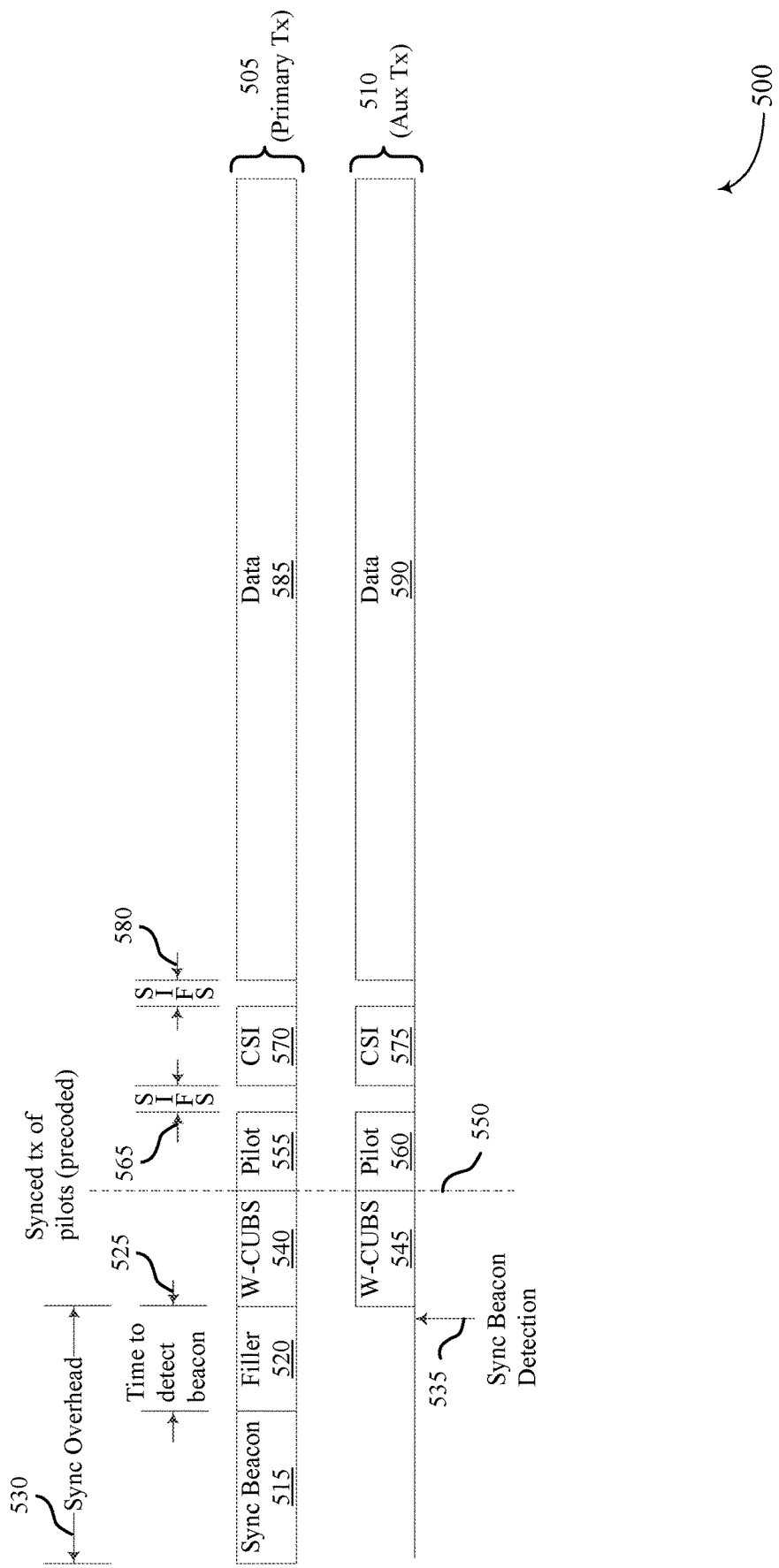
FIG. 5 illustrates an example of primary transmissions and auxiliary transmissions of synchronized transmitting nodes using a shared radio frequency spectrum in accordance with aspects of the present disclosure.

FIG. 5 illustrates example transmissions 500 including primary transmissions 505 and auxiliary transmissions 510 of synchronized transmitting nodes using a shared radio frequency spectrum in accordance with aspects of the present disclosure. In some cases, transmissions 500 may represent transmissions made according to techniques performed by a UE 115 or base station 105 as described with reference to FIGS. 1-4.

In the example of FIG. 5, primary transmission 505 may include a synchronization beacon 515, which may include information related to LBT frame timing of a first wireless node associated with a first operator. Following the synchronization beacon 515, a filler transmission 520 may be transmitted by the first wireless node, which may include, for example, control information or reference signals that are not relevant to an auxiliary transmission of a second wireless node associated with the first operator. The time to transmit the synchronization beacon 515 and the filler transmission 520 may be the synchronization overhead 530 for the LBT frame. The second wireless node may perform an LBT procedure and detect the synchronization beacon 515 of the first wireless node at point 535, following the time allotted to detect the beacon 525. The first wireless node may transmit a CUBS signal 540 (e.g., wideband CUBS (W-CUBS)), and the second wireless node may also transmit a CUBS signal 545.

Based on information in the synchronization beacon 515, the first wireless node and second wireless node may transmit synchronized pilot signals beginning at time 550. The first wireless node may transmit a pilot signal 555, and the second wireless node may transmit a pilot signal 560. The pilot signals 555 and 560 may be precoded pilot signals, such as a UE-specific reference signal, that may be transmitted to one or more receivers (e.g., UEs that are to receive the primary and auxiliary transmissions). A short inter-frame space (SIFS) 565 may be provided, and the first wireless node may receive CSI feedback 570 from one or more associated receivers, and the second wireless node may receive CSI feedback 575 from its associated receiver(s). Based on the CSI feedback 570 and 575, the first wireless node and second wireless node, respectively, may determine an MCS for subsequent data transmissions. A second SIFS 580 may be provided, and the first wireless node may transmit data 585 using the MCS determined based on the CSI feedback 570, and the second wireless node may transmit data 590 using the MCS determined based on the CSI feedback 575. Accordingly, data transmission rates may be determined that account for both the primary transmission 505 and the concurrent auxiliary transmission 510. As indicated, in some examples pilot signals 555 and 560 may be precoded in the same manner as data transmissions 585 and 590, and thus may help provide for relatively accurate CSI feedback and in turn relatively accurate MCS determination.

Figure 6:
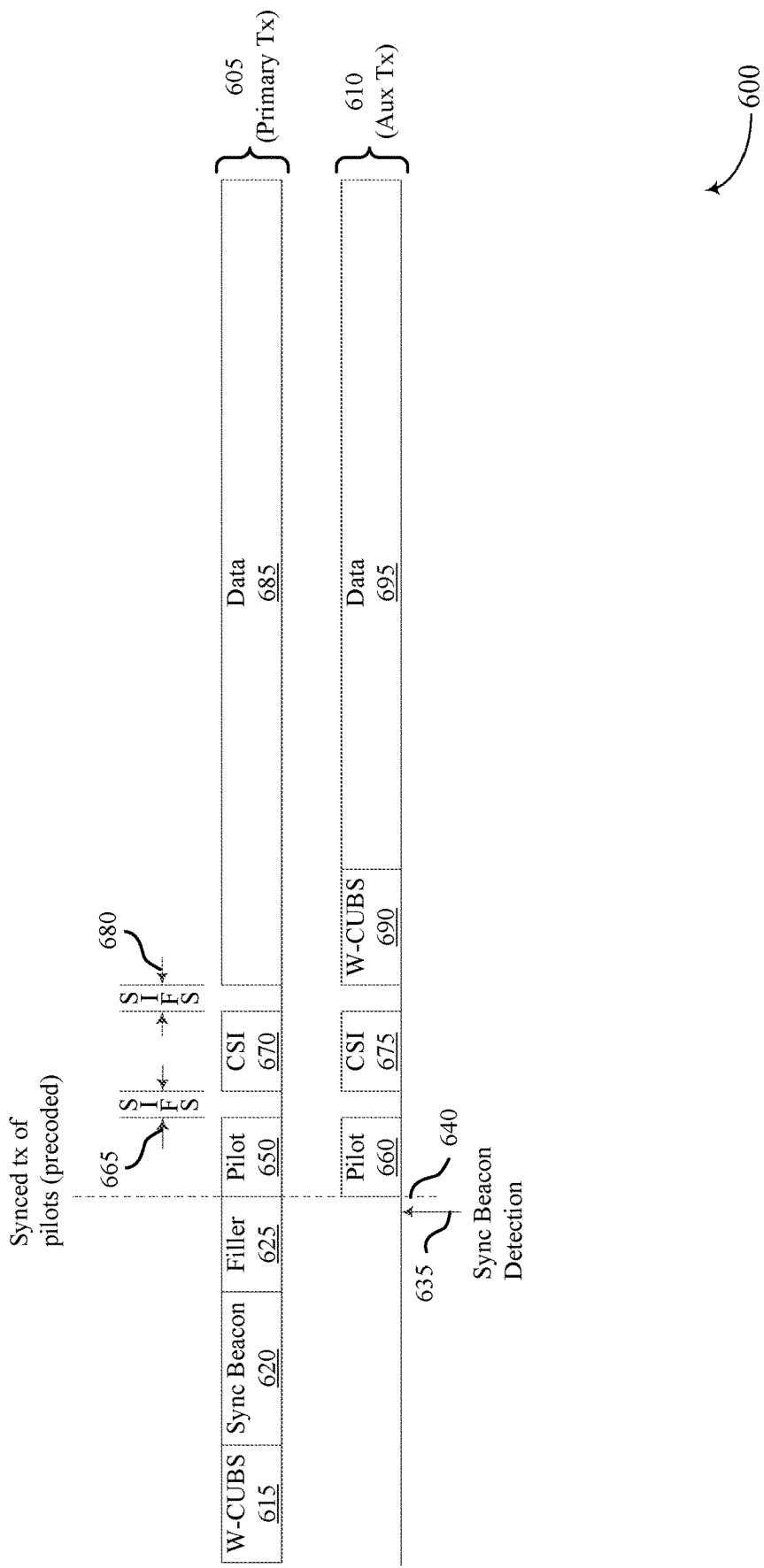
FIG. 6 illustrates another example of primary transmissions and auxiliary transmissions of synchronized transmitting nodes using a shared radio frequency spectrum in accordance with aspects of the present disclosure.

FIG. 6 illustrates another example of transmissions 600 including primary transmissions 605 and auxiliary transmissions 610 of synchronized transmitting nodes using a shared radio frequency spectrum in accordance with aspects of the present disclosure. In some cases, transmissions 600 may represent transmissions made according to techniques performed by a UE 115 or base station 105 as described with reference to FIGS. 1-4.

In the example of FIG. 6, primary transmission 605 may include a CUBS transmission 615 prior to a synchronization beacon 620 that may include information related to LBT frame timing of a first wireless node associated with a first operator. Following the synchronization beacon 620, a filler transmission 625 may be transmitted by the first wireless node, which may include, for example, control information or reference signals that are not relevant to an auxiliary transmission of a second wireless node associated with the first operator. The second wireless node may perform an LBT procedure and detect the CUBS transmission 615. Based on detection of the CUBS transmission 615, the second wireless node may receive and decode the synchronization beacon 620 by time 635. Such a technique may allow the second wireless node to operate with reduced power, and processing associated with detecting the CUBS signal 615 may be reduced relative to the processing for detecting and decoding the synchronization beacon 620. Thus, the second wireless node may just expend the additional power for synchronization beacon 620 detection upon successful receipt of the CUBS signal 615.

Based on information in the synchronization beacon 620, the first wireless node and second wireless node may transmit synchronized pilot signals beginning at time 640. The first wireless node may transmit a pilot signal 650, and the second wireless node may transmit a pilot signal 660. The pilot signals 650 and 660 may be precoded pilot signals, such as a UE-specific reference signal, that may be transmitted to one or more receivers (e.g., UEs that are to receive the primary and auxiliary transmissions). An SIFS 665 may be provided, and the first wireless node may receive CSI feedback 670 from one or more associated receivers, and the second wireless node may receive CSI feedback 675 from its associated receiver(s). Based on the CSI feedback 670 and 675, the first wireless node and second wireless node, respectively, may determine an MCS for subsequent data transmissions. A second SIFS 680 may be provided, and the first wireless node may transmit data 685 using the MCS determined based on the CSI feedback 670. Following the SIFS 680, the second wireless node may transmit W-CUBS 690 in accordance with LBT rules, and then may transmit data 695 using the MCS determined based on the CSI feedback 675. Accordingly, data transmission rates may be determined that account for both the primary transmission 605 and concurrent auxiliary transmission 610. As indicated, in some examples pilot signals 650 and 660 may be pre-coded in the same manner as data transmissions 685 and 695, and thus may help provide for relatively accurate CSI feedback and in turn relatively accurate MCS determination.

Using techniques such as described with respect to FIGS. 5 and 6, wireless nodes of an operator may detect primary transmissions, synchronize to an LBT frame of the primary transmissions, and transmit auxiliary transmissions concurrently with the primary transmissions. Thus, network efficiency may be enhanced through more efficient use of the shared radio frequency spectrum band. Further, transmissions of synchronized pilot signals by primary and auxiliary wireless nodes may provide for data transmission rate adjustments that account for the concurrent transmissions from the wireless nodes. Such rate adjustments may, however, provide a rate for the primary transmission that is not adjusted to an actual auxiliary transmission. For example, if a UE associated with the second wireless node does not respond with CSI feedback (or a clear-to-send (CTS) indication), the second wireless node may not transmit its data transmission, thus resulting in the data transmission of the primary transmission being at a lower rate than may have otherwise been available. In some examples, a wireless node attempting to transmit an auxiliary transmission may make such attempts for receivers that have a high likelihood of responding with CSI feedback or a CTS indication.

In other examples, the auxiliary transmission may include a relatively small amount of data that may not occupy the available capacity of the auxiliary transmission of the LBT frame. In such examples, the auxiliary transmission may be complete before the end of the LBT frame, while the primary transmission continues for the remaining duration of the LBT frame. Thus, the data transmission of the primary transmission may again be at a lower rate than may have otherwise been available. In some examples, auxiliary transmissions may be attempted if the amount of data to transmit in the auxiliary transmission exceeds a threshold (e.g., at least 80% of the available data that may be sent in the LBT frame using an auxiliary transmission) and may not be transmitted otherwise. In still other examples, precoding of a pilot signal may be different than precoding of subsequently transmitted data, which may result in a rate mismatch due to the CSI feedback being based on a differently precoded signal. In some examples, the precoding may be set to be the same between auxiliary transmission pilot signals and auxiliary transmission data transmissions.

Figure 7:
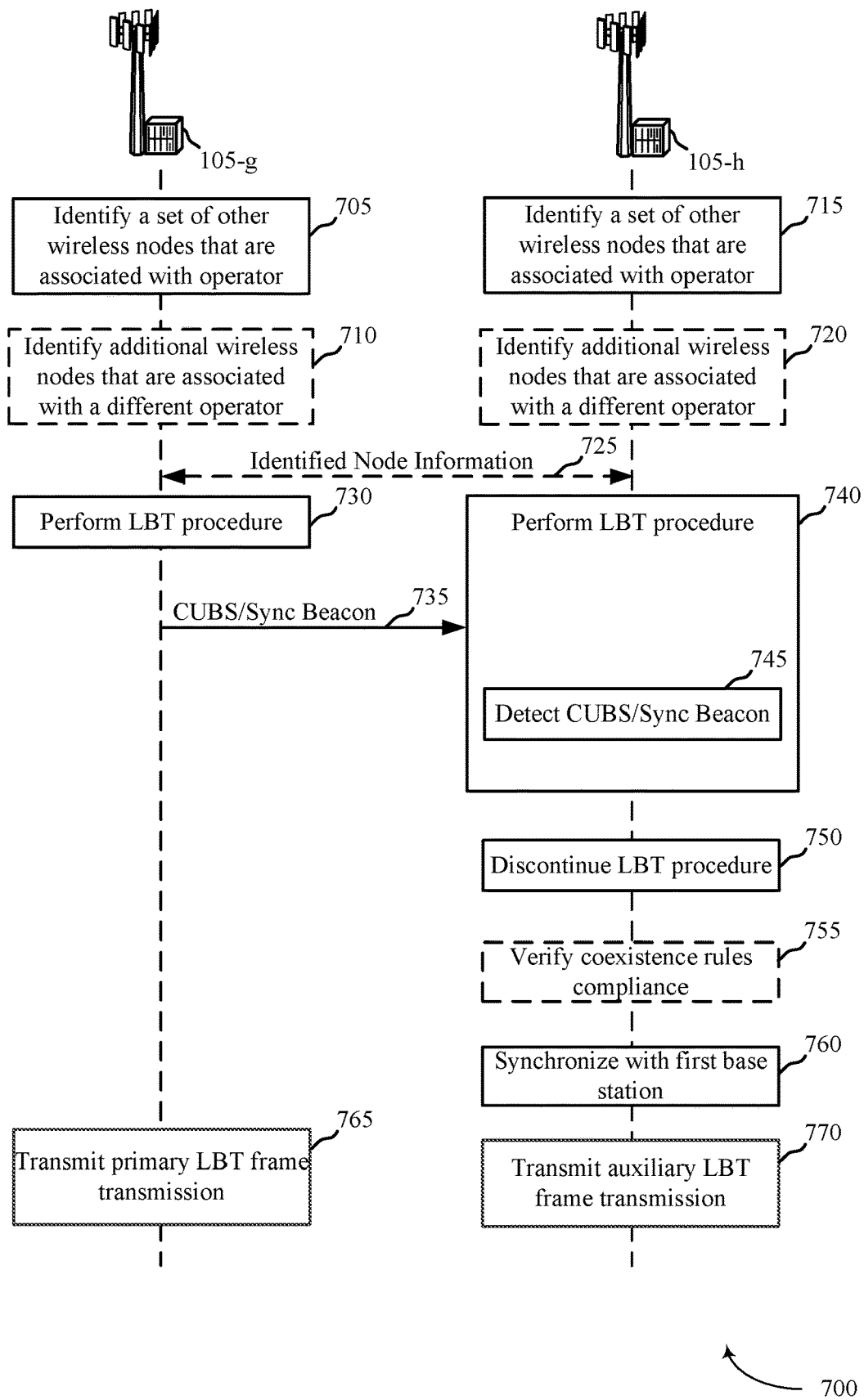
FIG. 7 illustrates an example of a process flow in a system that supports synchronization across transmitting nodes using a shared radio frequency spectrum in accordance with aspects of the present disclosure.

FIG. 7 illustrates an example of a process flow 700 for synchronization across transmitting nodes using a shared radio frequency spectrum in accordance with various aspects of the present disclosure. Process flow 700 may include first base station 105-*g* and second base station 105-*h*, which may be examples of the corresponding devices described with reference to FIG. 1-6. While the example of FIG. 7 illustrates base stations 105, such techniques may also be implemented by a UE or other wireless node of an operator.

At block 705, first base station 105-*g* may identify a set of other wireless nodes that are associated with a same operator as the operator of first base station 105-*g*. In the example of FIG. 7, both first base station 105-*g* and second base station 105-*h* may be wireless nodes of a first operator, and first base station 105-*g*, as a part of the operations of block 705, may identify second base station 105-*h* as being included in the identified set of other wireless nodes. The identification of other nodes as being associated with the first operator may include, in some examples, identifying a preamble transmitted by the other wireless nodes that includes an identification of the particular wireless node, and comparing the identification with a neighboring cell list of the first operator. At block 710, first base station 105-*g* may optionally identify additional wireless nodes that are associated with a different operator. The identification of additional wireless nodes as being associated with a different operator may include, in some examples, identifying a preamble transmitted by the additional wireless nodes that includes an identification of the particular wireless node, and comparing the identification with the neighboring cell list of the first operator, or determining that the preamble is for a different RAT than a RAT of the first operator (e.g., determining that the preamble is for a Wi-Fi transmission).

Second base station 105-*h* may similarly identify nodes within a PD range of the second base station. At block 715, second base station 105-*h* may identify a set of other wireless nodes that are associated with a same operator as the operator of second base station 105-*h*, namely the first operator in the example of FIG. 7. Thus, second base station 105-*h*, as a part of the operations of block 715, may identify first base station 105-*g* as being included in the identified set of other wireless nodes. Similarly as discussed above, the identification of other nodes as being associated with the first operator may include, in some examples, identifying a preamble transmitted by the other wireless nodes that includes an identification of the particular wireless node, and comparing the identification with a neighboring cell list of the first operator. At block 720, second base station 105-*h* may optionally identify additional wireless nodes that are associated with a different operator. The identification of additional wireless nodes as being associated with a different operator may again include, in some examples, identifying a preamble transmitted by the additional wireless nodes that includes an identification of the particular wireless node, and comparing the identification with the neighboring cell list of the first operator, or determining that the preamble is for a different RAT than a RAT of the first operator. First base station 105-*g* and second base station 105-*h* may optionally exchange information 725 on the identified nodes.

At block 730, first base station 105-*g* may perform an LBT procedure and win channel access to the shared radio frequency spectrum band. Upon winning contention through the LBT procedure, first base station 105-*g* may transmit a CUBS, synchronization beacon, or both, indicated at 735. In some examples, base station 105-*g* may simply transmit a CUBS, which may include a preamble that identifies first base station 105-*g* and that may be used for synchronization of auxiliary transmissions. In other examples, such as discussed with reference to FIGS. 5 and 6, first base station 105-*g* may transmit a synchronization beacon in addition to a CUBS to advertise that first base station 105-*g* is transmitting in an LBT frame and invite other wireless nodes of the first operator to transmit an auxiliary transmission during the LBT frame. In some examples, first base station 105-*g* may determine whether to allow other nodes to transmit auxiliary transmissions (e.g., based on a target data rate or quality of service (QoS) of the primary transmission) and transmit the synchronization beacon based on that determination.

At block 740, second base station 105-*h* may perform an LBT procedure seeking to gain channel access to transmit its own primary transmission. At block 745, second base station 105-*h* may detect the CUBS/Sync pilot of first base station 105-*g*. At block 750, second base station may discontinue its LBT procedure based on the detection of the first base station 105-*g* CUBS/Sync pilot. As discussed above, in some examples the discontinuing of the LBT procedure at second base station 105-*h* may include suspending a counter associated with the LBT procedure. In some examples, second base station 105-*h* may identify an amount of time remaining on the counter associated with the LBT procedure (e.g., an eCCA counter), which may be used for determining a contention window for a subsequent LBT procedure.

At optional block 755, second base station 105-*h* may optionally verify coexistence rules are complied with before initiating an auxiliary transmission. Such coexistence rules, such as discussed above with respect to FIGS. 3 and 4, may include one or more energy thresholds, a comparison of additional wireless nodes of different operators that are detected at each base station 105, or combinations thereof, according to some examples. At block 760, second base station 105-*h* may synchronize with first base station 105-*g*. Such synchronization may include, for example, an identification of timing information for initiating an auxiliary transmission during an LBT frame, which may be obtained from a CUBS or synchronization pilot of first base station 105-*g*. At block 765, first base station 105-*g* may transmit primary LBT frame transmission, and at block 770, second base station 105-*h* may transmit auxiliary LBT frame transmission. In some examples, second base station 105-*h* may determine one or more parameters for a subsequent LBT procedure based similarly as discussed above with reference to FIGS. 2-4.

Figure 8:
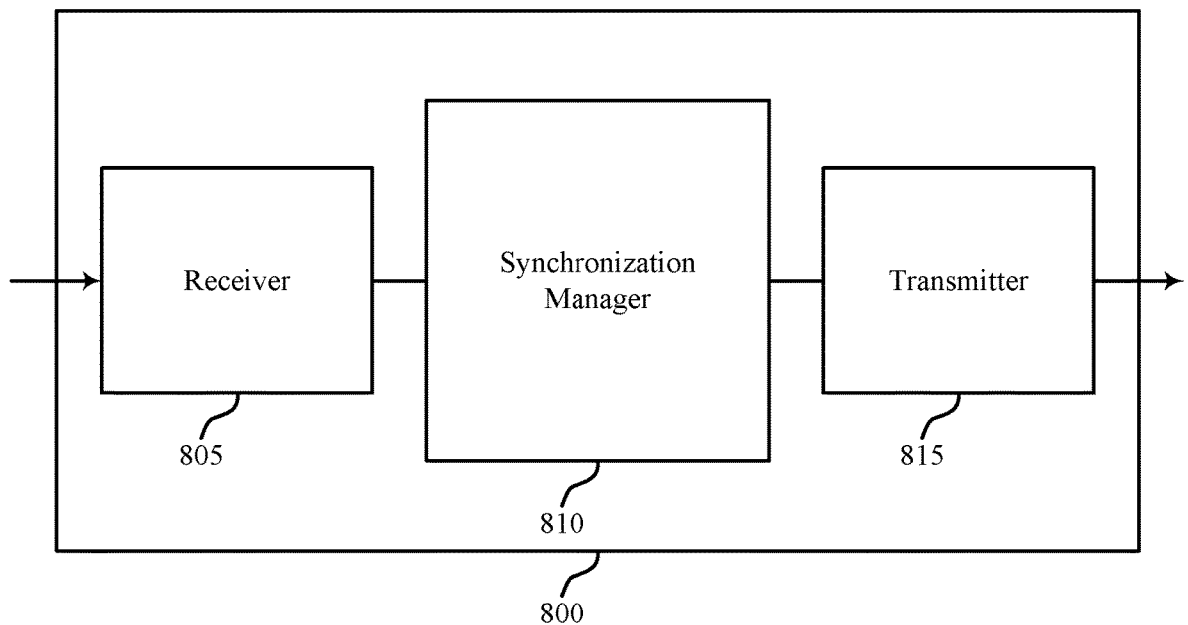
FIGS. 8 through 10 show block diagrams of a wireless device that supports synchronization across transmitting nodes using a shared radio frequency spectrum in accordance with aspects of the present disclosure.

FIG. 8 shows a block diagram of a wireless device 800 that supports synchronization across transmitting nodes using a shared radio frequency spectrum in accordance with various aspects of the present disclosure. Wireless device 800 may be an example of aspects of a UE 115 or base station 105 described with reference to FIGS. 1-7. Wireless device 800 may be a first wireless node, and may include receiver 805, synchronization manager 810 and transmitter 815. Wireless device 800 may also include a processor. Each of these components may be in communication with each other.

The receiver 805 may receive information such as packets, user data, or control information associated with various information channels (e.g., control channels, data channels, and information related to synchronization across transmitting nodes using shared radio frequency spectrum, etc.). Information may be passed on to other components of the device. The receiver 805 may be an example of aspects of the transceiver 1125 described with reference to FIG. 11.

The synchronization manager 810 may identify a set of other wireless nodes that are associated with the first wireless node (e.g., identify other wireless nodes of a first operator of the first wireless node), initiate an LBT procedure at the first wireless node for a shared radio frequency (RF) spectrum band, discontinue the LBT procedure based on detecting a second wireless node of the set of other wireless nodes transmitting an LBT frame, and initiate an auxiliary transmission using the shared RF spectrum band concurrently with a transmission of the second wireless node associated with the detected LBT frame.

In some examples, the wireless device 800 may initiate a primary transmission in an LBT frame, and the synchronization manager 810 may transmit a synchronization beacon signal using an unlicensed RF spectrum band, the synchronization beacon signal indicating one or more timing parameters for a primary transmission of the LBT frame, monitor for a signal from an auxiliary wireless node indicating that the auxiliary wireless node intends to transmit an auxiliary transmission using the shared RF spectrum band concurrently with the primary transmission of the LBT frame, and adjust a transmission rate of the primary transmission of the LBT frame based on the signal from the auxiliary wireless node.

In further examples, the wireless device 800 may initiate an auxiliary transmission based on a received synchronization beacon. The synchronization manager 810 in such examples may identify a set of other wireless nodes that are associated with the first wireless node, initiate an LBT procedure at the first wireless node for a shared RF spectrum band, discontinue the LBT procedure based on detecting the synchronization beacon from a second wireless node, and transmit an auxiliary transmission using the shared RF spectrum band concurrently with the primary transmission of the LBT frame. The synchronization beacon may indicate one or more timing parameters for the primary transmission of the LBT frame, and the auxiliary transmission may include an auxiliary transmission pilot signal that is synchronized with a primary transmission pilot signal of the primary transmission of the LBT frame. The synchronization manager 810 may then adjust a transmission rate of the auxiliary transmission of the LBT frame based on the primary transmission pilot signal. The synchronization manager 810 may also be an example of aspects of the synchronization manager 1105 described with reference to FIG. 11.

The transmitter 815 may transmit signals received from other components of wireless device 800. In some examples, the transmitter 815 may be collocated with a receiver in a transceiver module. For example, the transmitter 815 may be an example of aspects of the transceiver 1125 described with reference to FIG. 11. The transmitter 815 may include a single antenna, or it may include a plurality of antennas.

Figure 9:
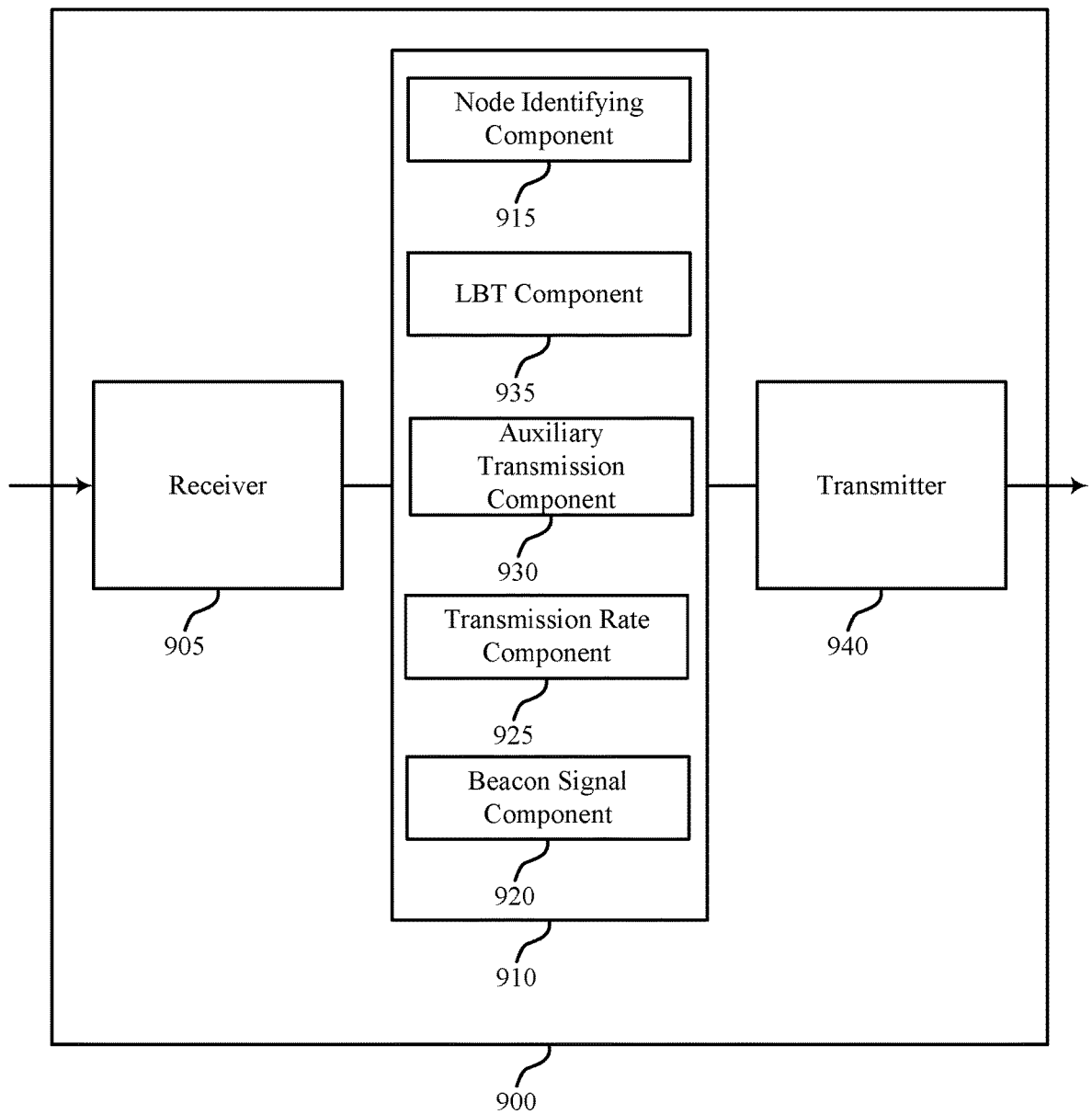

FIG. 9 shows a block diagram of a wireless device 900 that supports synchronization across transmitting nodes using a shared radio frequency spectrum in accordance with various aspects of the present disclosure. Wireless device 900 may be an example of aspects of a wireless device 800 or a UE 115 or base station 105 described with reference to FIGS. 1-8. Wireless device 900 may be a first wireless node and may include receiver 905, synchronization manager 910 and transmitter 940. Wireless device 900 may also include a processor. Each of these components may be in communication with each other.

The receiver 905 may receive information which may be passed on to other components of the device. The receiver 905 may also perform the functions described with reference to the receiver 805 of FIG. 8. The receiver 905 may be an example of aspects of the transceiver 1125 described with reference to FIG. 11.

The synchronization manager 910 may be an example of aspects of synchronization manager 810 described with reference to FIG. 8. The synchronization manager 910 may include node identifying component 915, beacon signal component 920, transmission rate component 925, auxiliary transmission component 930 and LBT component 935. The synchronization manager 910 may be an example of aspects of the synchronization manager 1105 described with reference to FIG. 11.

The node identifying component 915 may, in some examples, identify a first set of wireless nodes associated with the same operator as wireless device 800 that may be available for auxiliary transmissions based on one or more coexistence parameters. In some examples, node identifying component 915 may identify additional wireless nodes of other operators and the coexistence parameters may be determined based on whether any of the additional wireless nodes of other operators are also detected by wireless nodes in the first set of wireless nodes. In some examples, if a wireless node of a different operator is detected at wireless device 900 that is not detected by a second node of the first set of wireless nodes, the second node may be determined to be unavailable for auxiliary transmissions from the wireless device 900. In some cases, the one or more coexistence parameters may include a probability parameter, and where including one or more of the other wireless nodes associated with the first operator in the first set of other wireless nodes is based on the probability parameter. In some cases, the probability parameter is adjusted to provide a higher probability of including the second wireless node in the first set of other wireless nodes when the number of different operator wireless nodes is less than a threshold value. In some cases, the one or more coexistence parameters include an energy detection threshold.

The beacon signal component 920 may transmit a synchronization beacon signal as part of a primary transmission of wireless device 900 using an unlicensed RF spectrum band. The synchronization beacon signal may indicate, in some examples, one or more timing parameters for the primary transmission of an LBT frame.

The transmission rate component 925 may adjust a transmission rate of the primary transmission of the LBT frame or an auxiliary transmission of the LBT frame. The adjustment may be made based on pilot signals from other wireless nodes, CSI feedback from one or more receivers, or combinations thereof.

The auxiliary transmission component 930 may manage transmission of an auxiliary transmission using the shared RF spectrum band concurrently with a primary transmission of the LBT frame. The auxiliary transmission may include an auxiliary transmission pilot signal that is synchronized with a primary transmission pilot signal of the primary transmission of the LBT frame. In some examples, the auxiliary transmission pilot signal may be transmitted after a CUBS transmission. On other examples, the CUBS may be transmitted after the auxiliary transmission pilot signal. In some cases, the auxiliary transmission pilot signal may be precoded according to a precoding that is to be used for data transmissions of the auxiliary transmission.

In some cases, the auxiliary transmission component 930 may determine that the primary wireless node allows auxiliary transmissions during the LBT frame. In some cases, the determination that the primary wireless node allows auxiliary transmissions during the LBT frame includes: determining whether an auxiliary transmission prohibited flag is set by the primary wireless node.

The LBT component 935, in some examples, may manage LBT operations, which may include performing an LBT operation, and discontinuing the LBT operation upon detection of a primary transmission of an LBT frame. In some examples, the LBT component may resume the discontinued LBT procedure when a time duration of an auxiliary transmission is less than a threshold time value, and may initiate a new LBT procedure when the time duration is equal to or greater than the threshold time value. In some cases, a contention window for the new LBT procedure is selected based on the time duration of the auxiliary transmission. In some cases, a contention window for the new LBT procedure is selected based on a number of wireless nodes having transmissions that are detected at the first wireless node. In some examples, discontinuing the LBT operation may be based on detecting a synchronization beacon from a second wireless node, the synchronization beacon indicating one or more timing parameters for a primary transmission of an LBT frame.

The transmitter 940 may transmit signals received from other components of wireless device 900. In some examples, the transmitter 940 may be collocated with a receiver in a transceiver module. For example, the transmitter 940 may be an example of aspects of the transceiver 1125 described with reference to FIG. 11. The transmitter 940 may utilize a single antenna, or it may utilize a plurality of antennas.

Figure 10:
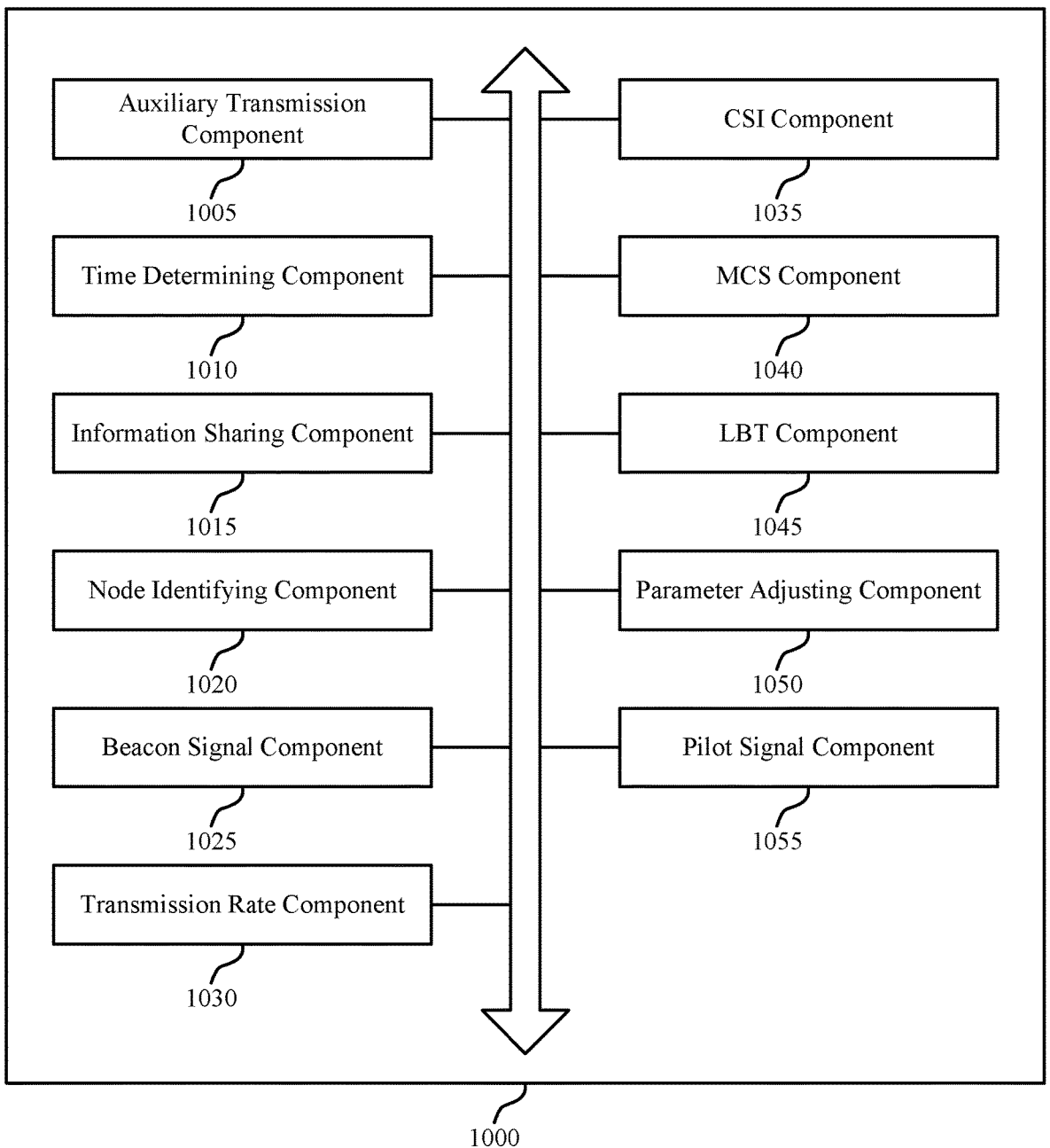

FIG. 10 shows a block diagram of a synchronization manager 1000 which may be an example of the corresponding component of wireless device 800 or wireless device 900. That is, synchronization manager 1000 may be an example of aspects of synchronization manager 810 or synchronization manager 910 described with reference to FIGS. 8 and 9. The synchronization manager 1000 may also be an example of aspects of the synchronization manager 1105 described with reference to FIG. 11.

The synchronization manager 1000 may include auxiliary transmission component 1005, time determining component 1010, information sharing component 1015, node identifying component 1020, beacon signal component 1025, transmission rate component 1030, CSI component 1035, MCS component 1040, LBT component 1045, parameter adjusting component 1050 and pilot signal component 1055. Each of these modules may communicate, directly or indirectly, with one another (e.g., via one or more buses).

The auxiliary transmission component 1005 may manage transmission of an auxiliary transmission using the shared RF spectrum band concurrently with a primary transmission of an LBT frame. The auxiliary transmission may include an auxiliary transmission pilot signal that is synchronized with a primary transmission pilot signal of the primary transmission of the LBT frame. In some examples, the auxiliary transmission component 1005 may transmit the auxiliary transmission pilot signal after a CUBS, or may transmit the CUBS after the auxiliary transmission pilot signal.

The time determining component 1010 may determine a time duration of the auxiliary transmission, which may be used to determine whether to initiate the auxiliary transmission or may be used for determining one or more parameters of a subsequent LBT procedure. The information sharing component 1015 may provide information related to other wireless nodes detected by the first wireless node with one or more wireless nodes of the set of other wireless nodes of a first operator, and receive information related to other wireless nodes detected by one or more wireless nodes of the set of other wireless nodes.

In some cases, the providing and receiving are performed using wireless transmissions between nodes of the set of other wireless nodes. In some cases, the providing and receiving are performed using wired connections between nodes of the set of other wireless nodes. In some cases, the providing and receiving are performed using one or more periodic beacon signals transmitted between nodes of the set of other wireless nodes.

The node identifying component 1020 may identify one or more of the other wireless nodes associated with the first operator in the set of other wireless nodes based on one or more coexistence parameters, identify a second number of wireless nodes of a different operator, and include wireless nodes in the set of other wireless nodes the coexistence parameters. Wireless nodes may be included in the set of other wireless nodes based on an LBT frame preamble and identification information of the wireless node included in the preamble.

The beacon signal component 1025 may transmit a synchronization beacon signal from a primary wireless node using an unlicensed RF spectrum band, the synchronization beacon signal indicating one or more timing parameters for a primary transmission of an LBT frame.

The transmission rate component 1030 may adjust a transmission rate of a primary transmission of the LBT frame based on a signal from the auxiliary wireless node, and adjust a transmission rate of an auxiliary transmission of the LBT frame based on a primary transmission pilot signal.

The CSI component 1035 may receive CSI feedback from either the primary transmission of the LBT frame or the auxiliary transmission of the LBT frame. In some cases, the transmission rate component 1030 may adjust the transmission rate based on the CSI feedback. The MCS component 1040 may select an MCS scheme based on the CSI feedback.

The LBT component 1045 may, in some examples, manage LBT operations, which may include performing an LBT operation, and discontinuing the LBT operation upon detection of a primary transmission of an LBT frame. In some examples, the LBT component 1045 may resume the discontinued LBT procedure when a time duration of an auxiliary transmission is less than a threshold time value, and may initiate a new LBT procedure when the time duration is equal to or greater than the threshold time value. In some cases, a contention window for the new LBT procedure is selected based on the time duration of the auxiliary transmission. In some cases, a contention window for the new LBT procedure is selected based on a number of wireless nodes having transmissions that are detected at the first wireless node. In some examples, discontinuing the LBT operation may be based on detecting a synchronization beacon from a second wireless node, the synchronization beacon indicating one or more timing parameters for a primary transmission of an LBT frame.

The parameter adjusting component 1050 may adjust one or more parameters of a subsequent LBT procedure performed at the first wireless node based on the auxiliary transmission. In some cases, the one or more parameters include one or more of a contention window parameter or a counter parameter associated with the subsequent LBT procedure. In some cases, the one or more parameters include an upper bound for a contention window that is selected to be larger than an upper bound that would be selected in an absence of the auxiliary transmission. In some cases, the one or more parameters include a lower bound for a contention window that is selected to be larger than a lower bound that would be selected in an absence of the auxiliary transmission.

The pilot signal component 1055 may (in conjunction with the transmitter) transmit a primary wireless node pilot signal using the unlicensed RF spectrum band that is synchronized with an auxiliary wireless node pilot signal. In some cases, transmitting the primary wireless node pilot signal further includes: precoding the primary wireless node pilot signal according to a precoding that is to be used for data transmissions of the primary transmission of the LBT frame. In other examples, the pilot signal component 1055 may (in conjunction with the transmitter) transmit an auxiliary wireless node pilot signal using the unlicensed RF spectrum band that is synchronized with a primary wireless node pilot signal. In some cases, transmitting the auxiliary wireless node pilot signal further includes: precoding the auxiliary wireless node pilot signal according to a precoding that is to be used for data transmissions of the auxiliary transmission of the LBT frame.

Figure 11:
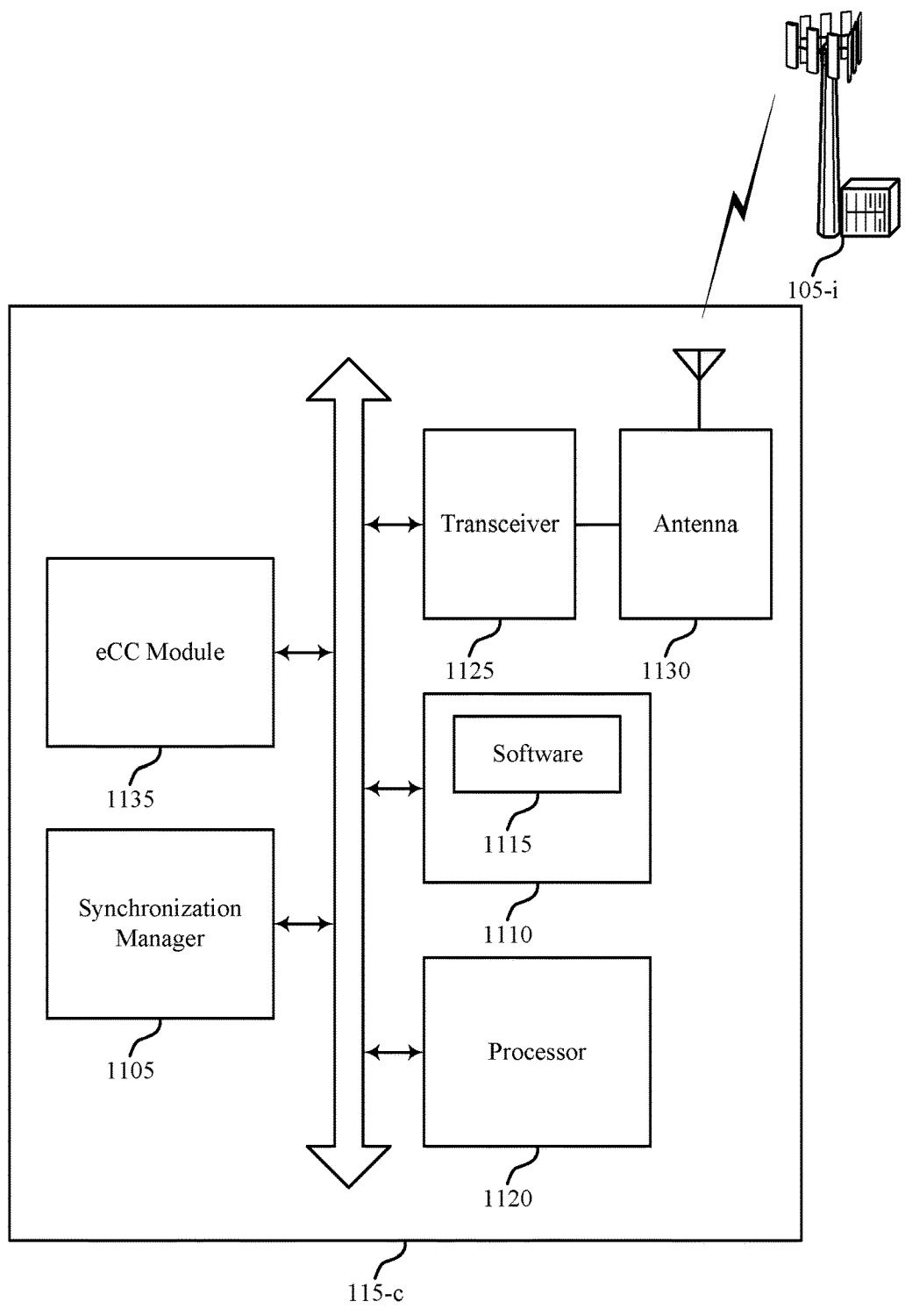
FIG. 11 illustrates a block diagram of a system including a UE that supports synchronization across transmitting nodes using a shared radio frequency spectrum in accordance with aspects of the present disclosure.

FIG. 11 shows a diagram of a system 1100 including a device that supports synchronization across transmitting nodes using a shared radio frequency spectrum in accordance with various aspects of the present disclosure. For example, system 1100 may include UE 115-*c*, which may be an example of a wireless device 800, a wireless device 900, or a UE 115 as described with reference to FIGS. 1-10.

UE 115-*c* may also include synchronization manager 1105, memory 1110, processor 1120, transceiver 1125, antenna 1130 and eCC module 1135. Each of these modules may communicate, directly or indirectly, with one another (e.g., via one or more buses). The synchronization manager 1105 may be an example of a synchronization manager as described with reference to FIGS. 8 through 10.

The memory 1110 may include random access memory (RAM) and read only memory (ROM). The memory 1110 may store computer-readable, computer-executable software including instructions that, when executed, cause the processor to perform various functions described herein (e.g., synchronization across transmitting nodes using shared radio frequency spectrum, etc.). In some cases, the software 1115 may not be directly executable by the processor but may cause a computer (e.g., when compiled and executed) to perform functions described herein. The processor 1120 may include an intelligent hardware device, (e.g., a central processing unit (CPU), a microcontroller, an application specific integrated circuit (ASIC), etc.)

The transceiver 1125 may communicate bi-directionally, via one or more antennas, wired, or wireless links, with one or more networks, as described above. For example, the transceiver 1125 may communicate bi-directionally with a base station 105 or a UE 115. The transceiver 1125 may also include a modem to modulate the packets and provide the modulated packets to the antennas for transmission, and to demodulate packets received from the antennas. In some cases, the wireless device may include a single antenna 1130. However, in some cases the device may have more than one antenna 1130, which may be capable of concurrently transmitting or receiving multiple wireless transmissions.

The eCC module 1135 may enable operations using eCCs such as communication using shared or unlicensed spectrum, using reduced TTIs or subframe durations, or using a large number of component carriers.

Figure 12:
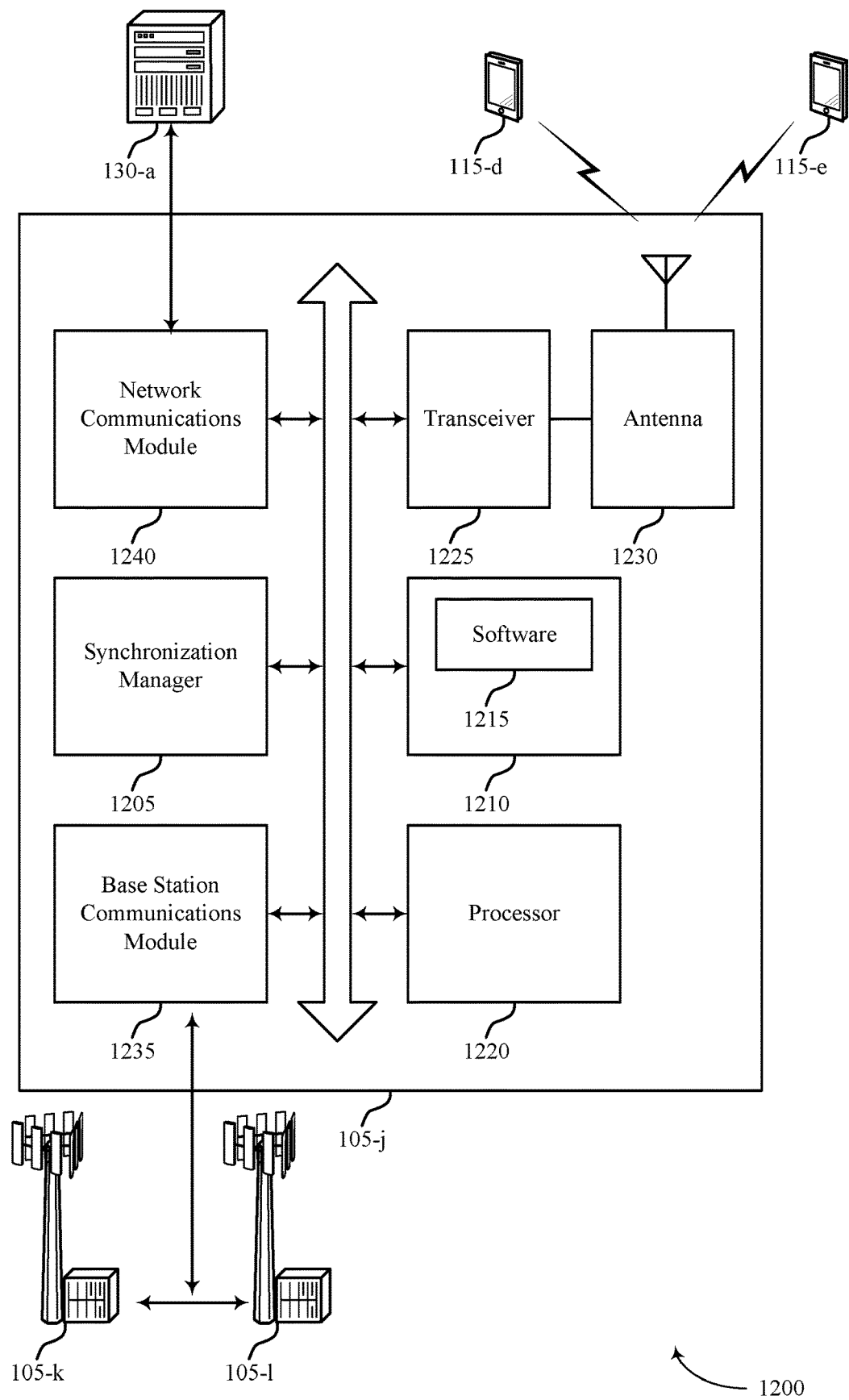
FIG. 12 illustrates a block diagram of a system including a base station that supports synchronization across transmitting nodes using a shared radio frequency spectrum in accordance with aspects of the present disclosure.

FIG. 12 shows a diagram of a wireless system 1200 including a device that supports synchronization across transmitting nodes using shared radio frequency spectrum in accordance with various aspects of the present disclosure. For example, wireless system 1200 may include base station 105-*j*, which may be an example of a wireless device 800, a wireless device 900, or a base station 105 as described with reference to FIGS. 1-11. Base station 105-*j* may also include components for bi-directional voice and data communications including components for transmitting communications and components for receiving communications. For example, base station 105-*j* may communicate bi-directionally with one or more UEs 115.

Base station 105-*j* may also include synchronization manager 1205, memory 1210, processor 1220, transceiver 1225, antenna 1230, base station communications module 1235 and network communications module 1240. Each of these modules may communicate, directly or indirectly, with one another (e.g., via one or more buses). The synchronization manager 1205 may be an example of a synchronization manager as described with reference to FIGS. 8 through 10.

The memory 1210 may include RAM and ROM. The memory 1210 may store computer-readable, computer-executable software including instructions that, when executed, cause the processor to perform various functions described herein (e.g., synchronization across transmitting nodes using shared radio frequency spectrum, etc.). In some cases, the software 1215 may not be directly executable by the processor but may cause a computer (e.g., when compiled and executed) to perform functions described herein. The processor 1220 may include an intelligent hardware device, (e.g., a CPU, a microcontroller, an ASIC, etc.)

The transceiver 1225 may communicate bi-directionally, via one or more antennas, wired, or wireless links, with one or more networks, as described above. For example, the transceiver 1225 may communicate bi-directionally with a base station 105 or a UE 115. The transceiver 1225 may also include a modem to modulate the packets and provide the modulated packets to the antennas for transmission, and to demodulate packets received from the antennas. In some cases, the wireless device may include a single antenna 1230. However, in some cases the device may have more than one antenna 1130, which may be capable of concurrently transmitting or receiving multiple wireless transmissions.

The base station communications module 1235 may manage communications with other base stations 105, and may include a controller or scheduler for controlling communications with UEs 115 in cooperation with other base stations 105. For example, the base station communications module 1235 may coordinate scheduling for transmissions to UEs 115 for various interference mitigation techniques such as beamforming or joint transmission. In some examples, base station communications module 1235 may provide an X2 interface within an LTE/LTE-A wireless communication network technology to provide communication between base stations 105. In some examples, base stations 105 may communicate information related to identified nodes of a same operator, identified nodes of different operators, or combinations thereof.

The network communications module 1240 may manage communications with the core network (e.g., via one or more wired backhaul links). For example, the network communications module 1240 may manage the transfer of data communications for client devices, such as one or more UEs 115.

Figure 13:
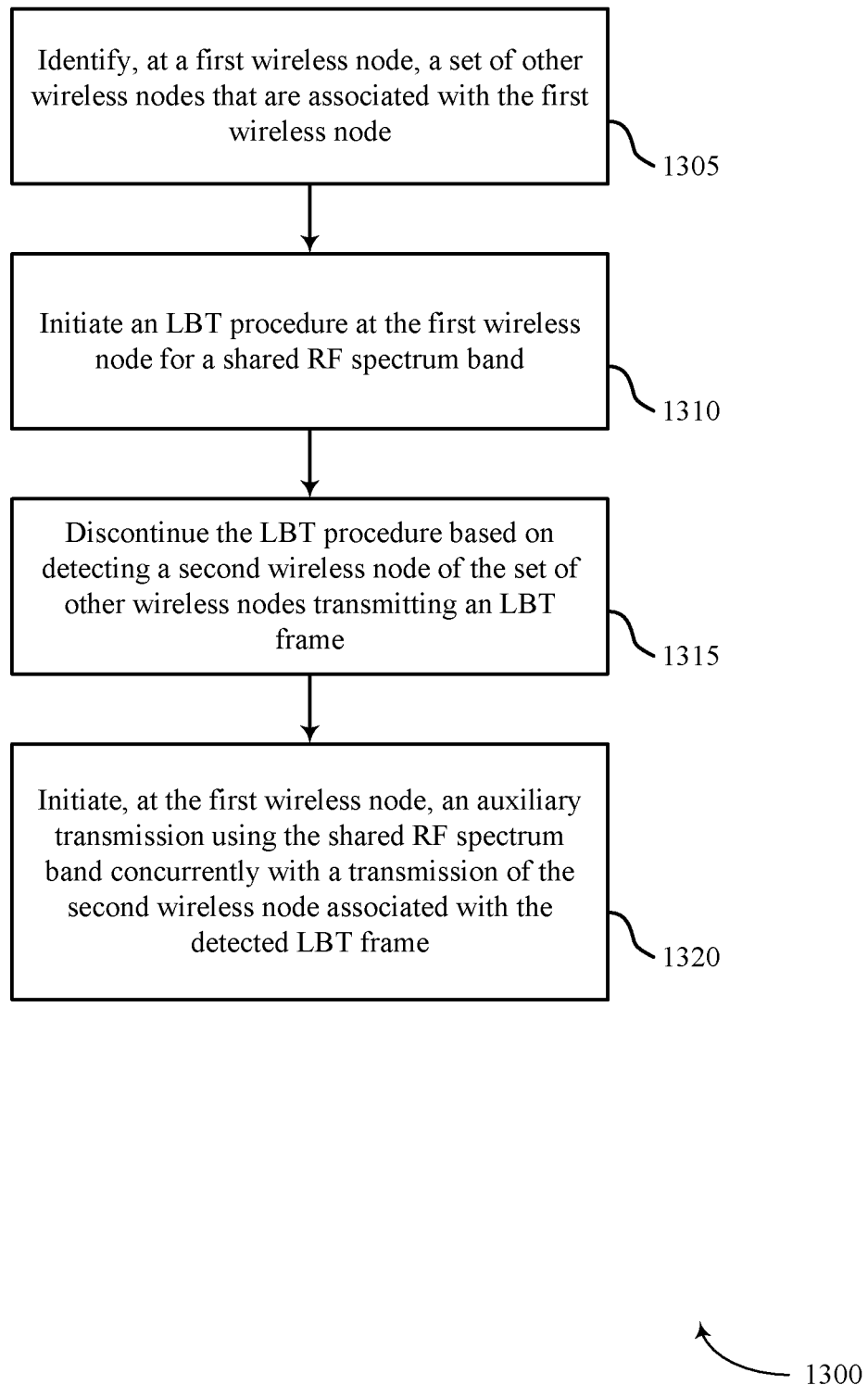
FIGS. 13 through 19 illustrate methods for synchronization across transmitting nodes using a shared radio frequency spectrum in accordance with aspects of the present disclosure.

FIG. 13 shows a flowchart illustrating a method 1300 for synchronization across transmitting nodes using a shared radio frequency spectrum in accordance with various aspects of the present disclosure. The operations of method 1300 may be implemented by a device such as a UE 115 or base station 105 or its components as described with reference to FIGS. 1-12. For example, the operations of method 1300 may be performed by the synchronization manager as described herein. In some examples, the UE 115 or base station 105 may execute a set of codes to control the functional elements of the device to perform the functions described below. Additionally or alternatively, the UE 115 or base station 105 may perform aspects of the functions described below using special-purpose hardware.

At block 1305, the UE 115 or base station 105 may be a first wireless node and may identify a set of other wireless nodes that are associated with the first wireless node, as described above with reference to FIGS. 2-7. In certain examples, the operations of block 1305 may be performed by the node identifying component as described with reference to FIGS. 9 and 10.

At block 1310, the UE 115 or base station 105 may initiate an LBT procedure for a shared RF spectrum band as described above with reference to FIGS. 2-7. In certain examples, the operations of block 1310 may be performed by the LBT component as described with reference to FIGS. 9 and 10.

At block 1315, the UE 115 or base station 105 may discontinue the LBT procedure based on detecting a second wireless node of the set of other wireless nodes transmitting an LBT frame as described above with reference to FIGS. 2-7. In certain examples, the operations of block 1315 may be performed by the LBT component as described with reference to FIGS. 9 and 10.

At block 1320, the UE 115 or base station 105 may initiate an auxiliary transmission using the shared RF spectrum band concurrently with a transmission of the second wireless node associated with the detected LBT frame as described above with reference to FIGS. 2-7. In certain examples, the operations of block 1320 may be performed by the auxiliary transmission component as described with reference to FIGS. 9 and 10.

Figure 14:
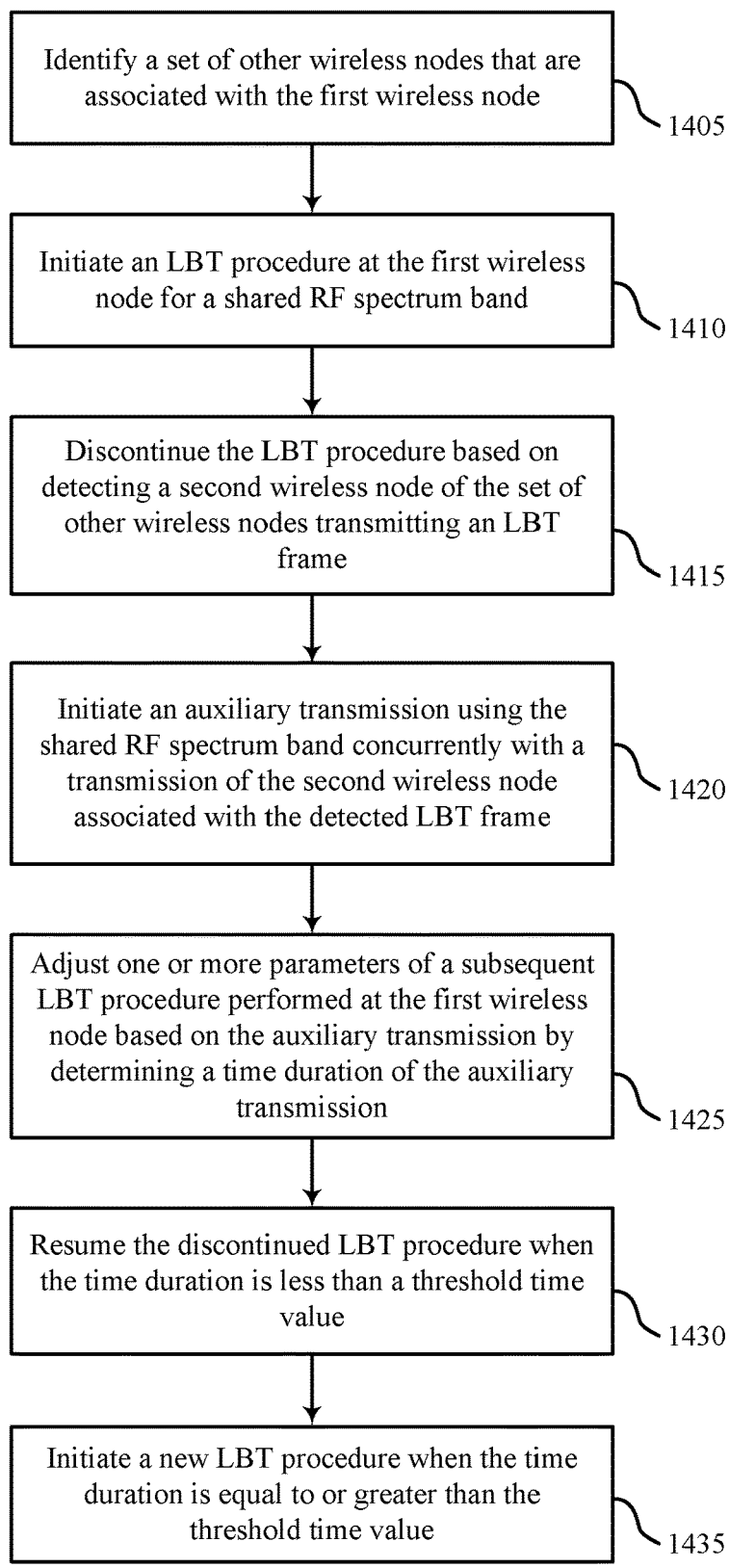

FIG. 14 shows a flowchart illustrating a method 1400 for synchronization across transmitting nodes using a shared radio frequency spectrum in accordance with various aspects of the present disclosure. The operations of method 1400 may be implemented by a device such as a UE 115 or base station 105 or its components as described with reference to FIGS. 1-12. For example, the operations of method 1400 may be performed by the synchronization manager as described herein. In some examples, the UE 115 or base station 105 may execute a set of codes to control the functional elements of the device to perform the functions described below. Additionally or alternatively, the UE 115 or base station 105 may perform aspects of the functions described below using special-purpose hardware.

At block 1405, the UE 115 or base station 105 may identify, at a first wireless node, a set of other wireless nodes that are associated with the first wireless node as described above with reference to FIGS. 2-7. In certain examples, the operations of block 1405 may be performed by the node identifying component as described with reference to FIGS. 9 and 10.

At block 1410, the UE 115 or base station 105 may initiate an LBT procedure at the first wireless node for a shared RF spectrum band as described above with reference to FIGS. 2-7. In certain examples, the operations of block 1410 may be performed by the LBT component as described with reference to FIGS. 9 and 10.

At block 1415, the UE 115 or base station 105 may discontinue the LBT procedure based on detecting a second wireless node of the set of other wireless nodes transmitting an LBT frame as described above with reference to FIGS. 2-7. In certain examples, the operations of block 1415 may be performed by the LBT component as described with reference to FIGS. 9 and 10.

At block 1420, the UE 115 or base station 105 may initiate, at the first wireless node, an auxiliary transmission using the shared RF spectrum band concurrently with a transmission of the second wireless node associated with the detected LBT frame as described above with reference to FIGS. 2-7. In certain examples, the operations of block 1420 may be performed by the auxiliary transmission component as described with reference to FIGS. 9 and 10.

At block 1425, the UE 115 or base station 105 may adjust one or more parameters of a subsequent LBT procedure performed at the first wireless node based on the auxiliary transmission as described above with reference to FIGS. 2-7. In some case, the adjusting includes: determining a time duration of the auxiliary transmission. In certain examples, the operations of block 1425 may be performed by the parameter adjusting component as described with reference to FIGS. 9 and 10.

At block 1430, the UE 115 or base station 105 may resume the discontinued LBT procedure when the time duration is less than a threshold time value as described above with reference to FIGS. 2-7. In certain examples, the operations of block 1430 may be performed by the LBT component as described with reference to FIGS. 9 and 10.

At block 1435, the UE 115 or base station 105 may initiate a new LBT procedure when the time duration is equal to or greater than the threshold time value as described above with reference to FIGS. 2-7. In certain examples, the operations of block 1435 may be performed by the LBT component as described with reference to FIGS. 9 and 10.

Figure 15:
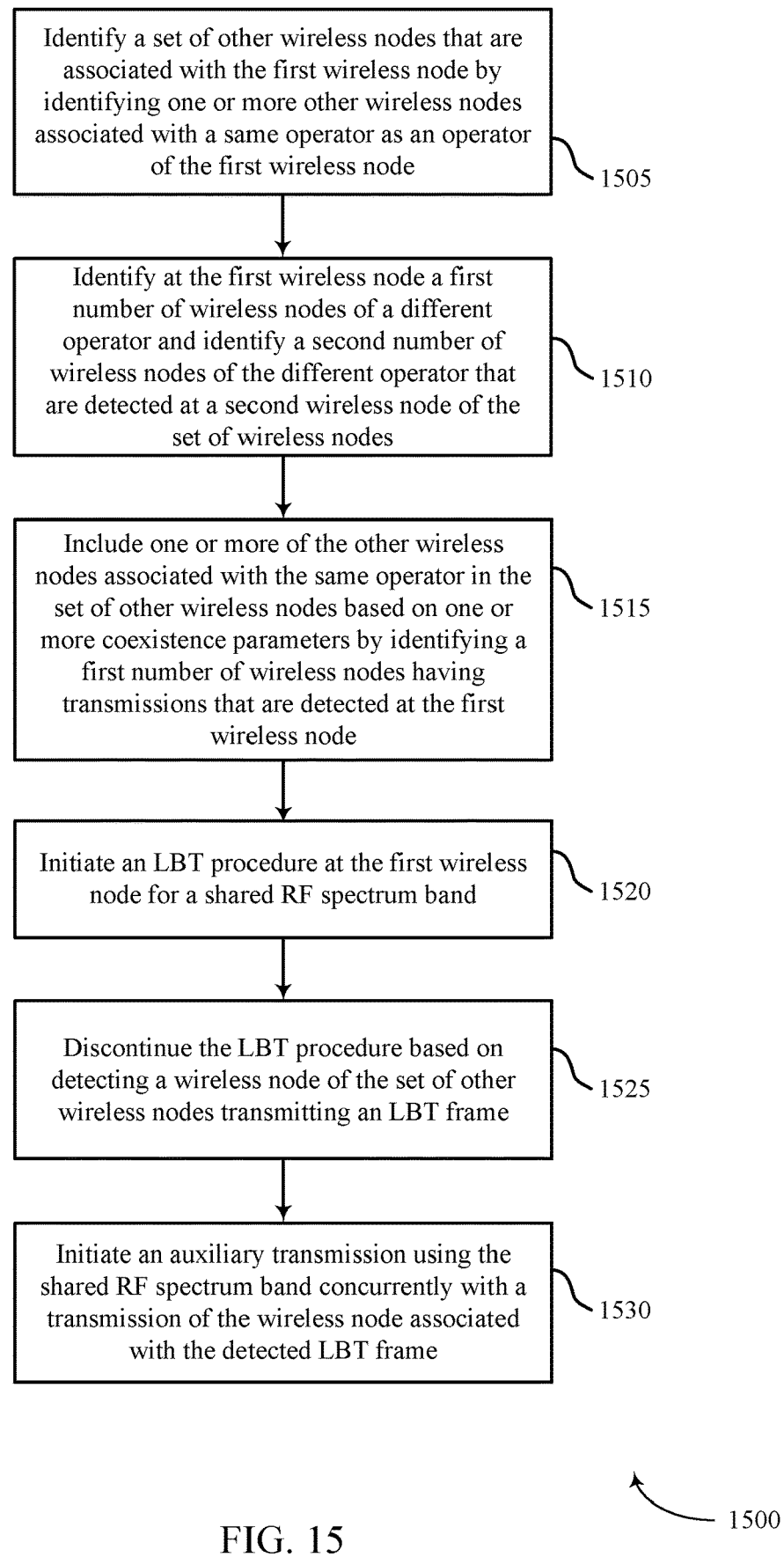

FIG. 15 shows a flowchart illustrating a method 1500 for synchronization across transmitting nodes using a shared radio frequency spectrum in accordance with various aspects of the present disclosure. The operations of method 1500 may be implemented by a device such as a UE 115 or base station 105 or its components as described with reference to FIGS. 1-12. For example, the operations of method 1500 may be performed by the synchronization manager as described herein. In some examples, the UE 115 or base station 105 may execute a set of codes to control the functional elements of the device to perform the functions described below. Additionally or alternatively, the UE 115 or base station 105 may perform aspects of the functions described below using special-purpose hardware.

At block 1505, the UE 115 or base station 105 may identify a set of other wireless nodes that are associated with the first wireless node as described above with reference to FIGS. 2-7. In some case, the identifying the set of other wireless nodes includes: identifying one or more other wireless nodes associated with a same operator as an operator of the first wireless node. In certain examples, the operations of block 1505 may be performed by the node identifying component as described with reference to FIGS. 9 and 10.

At block 1510, the UE 115 or base station 105 may identify a first number of wireless nodes of a different operator and identify a second number of wireless nodes of the different operator that are detected at a second wireless node of the set of wireless nodes, as described above with reference to FIGS. 2-7. In certain examples, the operations of block 1510 may be performed by the node identifying component as described with reference to FIGS. 9 and 10.

At block 1515, the UE 115 or base station 105 may include one or more of the other wireless nodes associated with the same operator in the set of other wireless nodes based on one or more coexistence parameters as described above with reference to FIGS. 2-7. In certain examples, the operations of block 1515 may be performed by the node identifying component as described with reference to FIGS. 9 and 10.

At block 1520, the UE 115 or base station 105 may initiate an LBT procedure at the first wireless node for a shared RF spectrum band as described above with reference to FIGS. 2-7. In certain examples, the operations of block 1520 may be performed by the LBT component as described with reference to FIGS. 9 and 10.

At block 1525, the UE 115 or base station 105 may discontinue the LBT procedure based on detecting a second wireless node of the set of other wireless nodes transmitting an LBT frame as described above with reference to FIGS. 2-7. In certain examples, the operations of block 1525 may be performed by the LBT component as described with reference to FIGS. 9 and 10.

At block 1530, the UE 115 or base station 105 may initiate, at the first wireless node, an auxiliary transmission using the shared RF spectrum band concurrently with a transmission of the second wireless node associated with the detected LBT frame as described above with reference to FIGS. 2-7. In certain examples, the operations of block 1530 may be performed by the auxiliary transmission component as described with reference to FIGS. 9 and 10.

Figure 16:
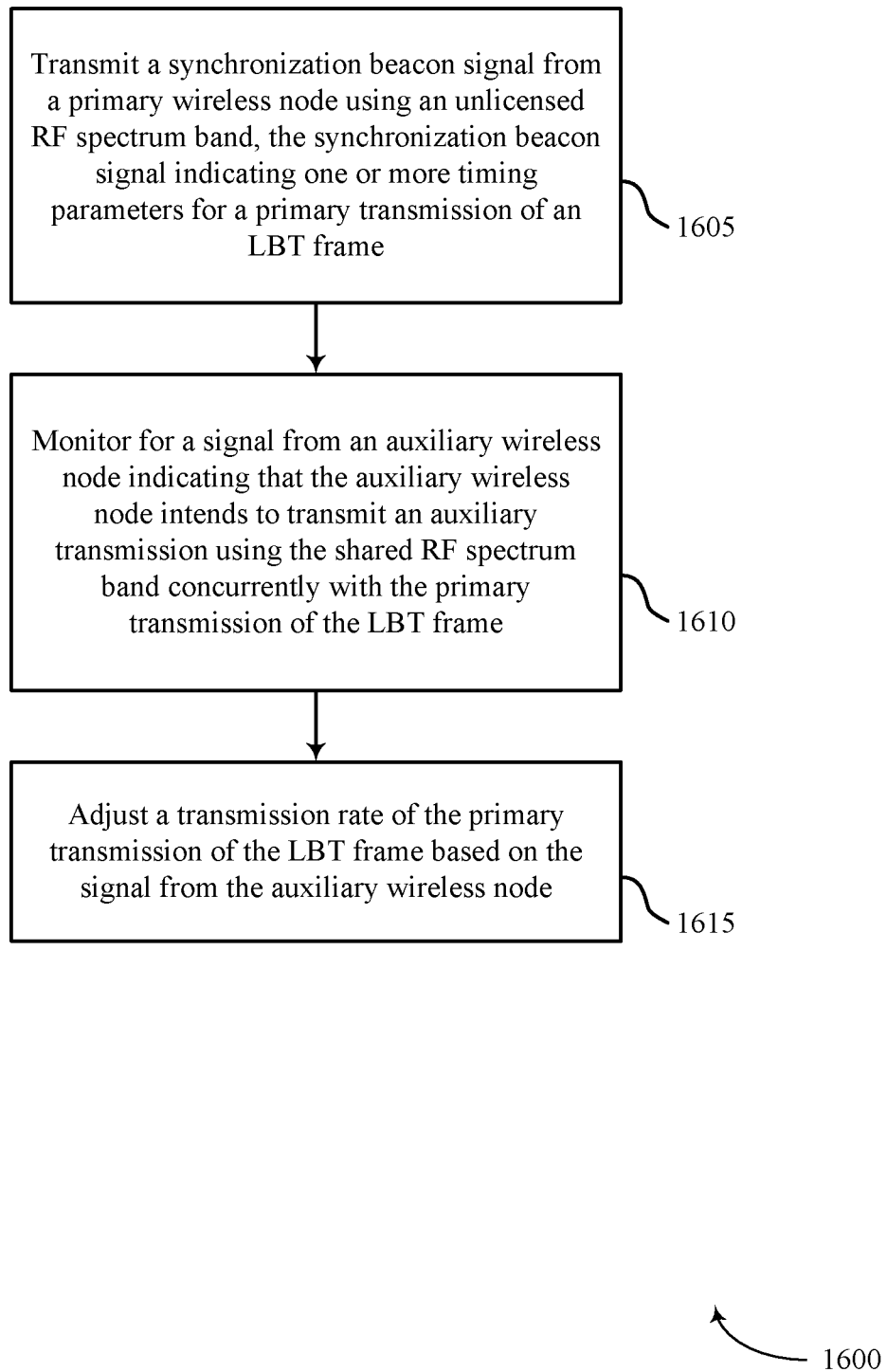

FIG. 16 shows a flowchart illustrating a method 1600 for synchronization across transmitting nodes using a shared radio frequency spectrum in accordance with various aspects of the present disclosure. The operations of method 1600 may be implemented by a device such as a UE 115 or base station 105 or its components as described with reference to FIGS. 1-12. For example, the operations of method 1600 may be performed by the synchronization manager as described herein. In some examples, the UE 115 or base station 105 may execute a set of codes to control the functional elements of the device to perform the functions described below. Additionally or alternatively, the UE 115 or base station 105 may perform aspects of the functions described below using special-purpose hardware.

At block 1605, the UE 115 or base station 105 may transmit a synchronization beacon signal as a primary wireless node using an unlicensed RF spectrum band, the synchronization beacon signal indicating one or more timing parameters for a primary transmission of an LBT frame as described above with reference to FIGS. 2-7. In certain examples, the operations of block 1605 may be performed by the beacon signal component as described with reference to FIGS. 9 and 10.

At block 1610, the UE 115 or base station 105 may monitor for a signal from an auxiliary wireless node indicating that the auxiliary wireless node intends to transmit an auxiliary transmission using the shared RF spectrum band concurrently with the primary transmission of the LBT frame as described above with reference to FIGS. 2-7. In certain examples, the operations of block 1610 may be performed by the auxiliary transmission component as described with reference to FIGS. 9 and 10.

At block 1615, the UE 115 or base station 105 may adjust a transmission rate of the primary transmission of the LBT frame based on the signal from the auxiliary wireless node as described above with reference to FIGS. 2-7. In certain examples, the operations of block 1615 may be performed by the transmission rate component as described with reference to FIGS. 9 and 10.

Figure 17:
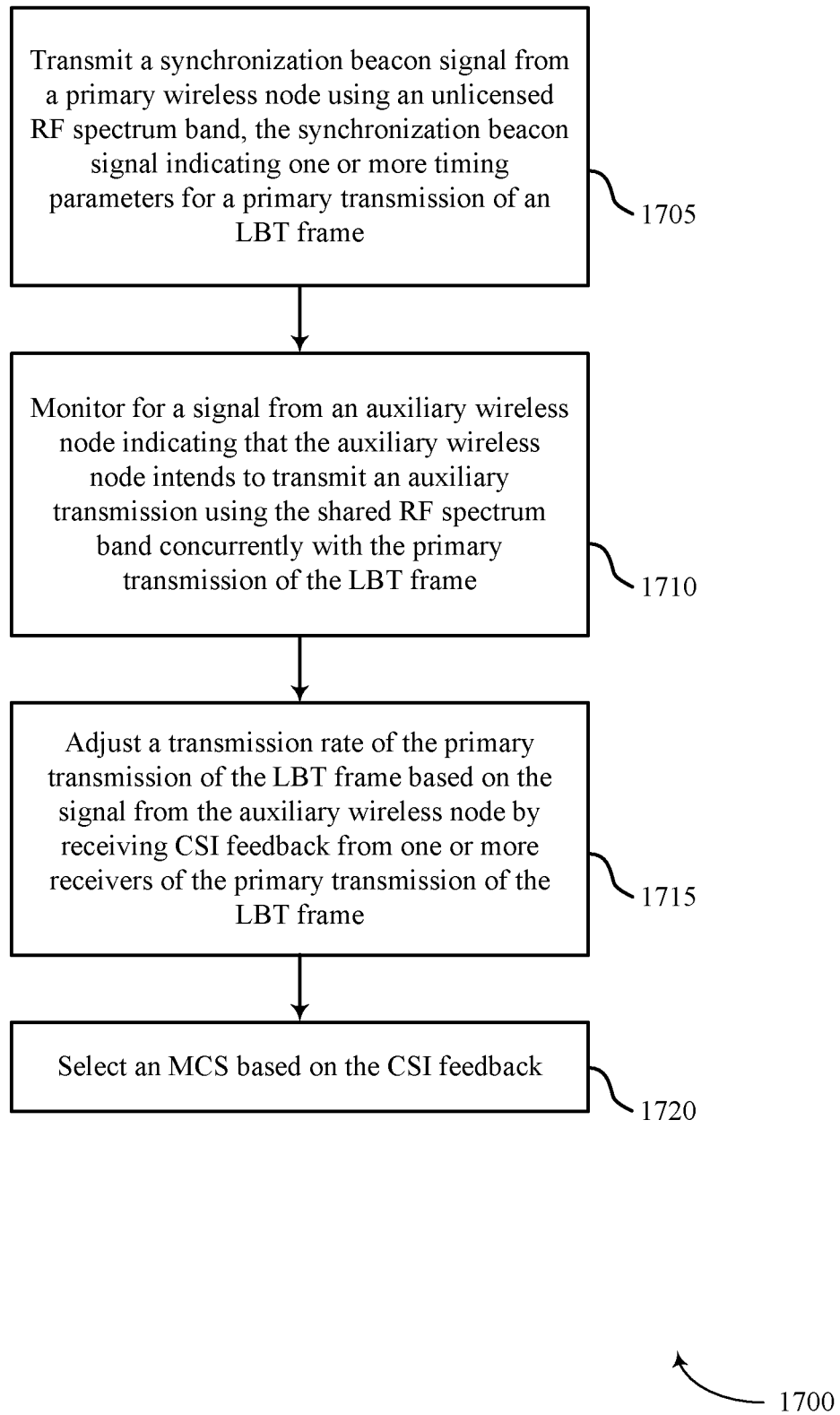

FIG. 17 shows a flowchart illustrating a method 1700 for synchronization across transmitting nodes using a shared radio frequency spectrum in accordance with various aspects of the present disclosure. The operations of method 1700 may be implemented by a device such as a UE 115 or base station 105 or its components as described with reference to FIGS. 1-12. For example, the operations of method 1700 may be performed by the synchronization manager as described herein. In some examples, the UE 115 or base station 105 may execute a set of codes to control the functional elements of the device to perform the functions described below. Additionally or alternatively, the UE 115 or base station 105 may perform aspects of the functions described below using special-purpose hardware.

At block 1705, the UE 115 or base station 105 may transmit a synchronization beacon signal as a primary wireless node using an unlicensed RF spectrum band, the synchronization beacon signal indicating one or more timing parameters for a primary transmission of an LBT frame as described above with reference to FIGS. 2-7. In certain examples, the operations of block 1705 may be performed by the beacon signal component as described with reference to FIGS. 9 and 10.

At block 1710, the UE 115 or base station 105 may monitor for a signal from an auxiliary wireless node indicating that the auxiliary wireless node intends to transmit an auxiliary transmission using the shared RF spectrum band concurrently with the primary transmission of the LBT frame as described above with reference to FIGS. 2-7. In certain examples, the operations of block 1710 may be performed by the auxiliary transmission component as described with reference to FIGS. 9 and 10.

At block 1715, the UE 115 or base station 105 may adjust a transmission rate of the primary transmission of the LBT frame based on the signal from the auxiliary wireless node as described above with reference to FIGS. 2-7. In some cases, the adjusting includes: receiving CSI feedback from one or more receivers of the primary transmission of the LBT frame. In certain examples, the operations of block 1715 may be performed by the transmission rate component as described with reference to FIGS. 9 and 10.

At block 1720, the UE 115 or base station 105 may select an MCS scheme based on the CSI feedback as described above with reference to FIGS. 2-7. In certain examples, the operations of block 1720 may be performed by the MCS component as described with reference to FIGS. 9 and 10.

Figure 18:
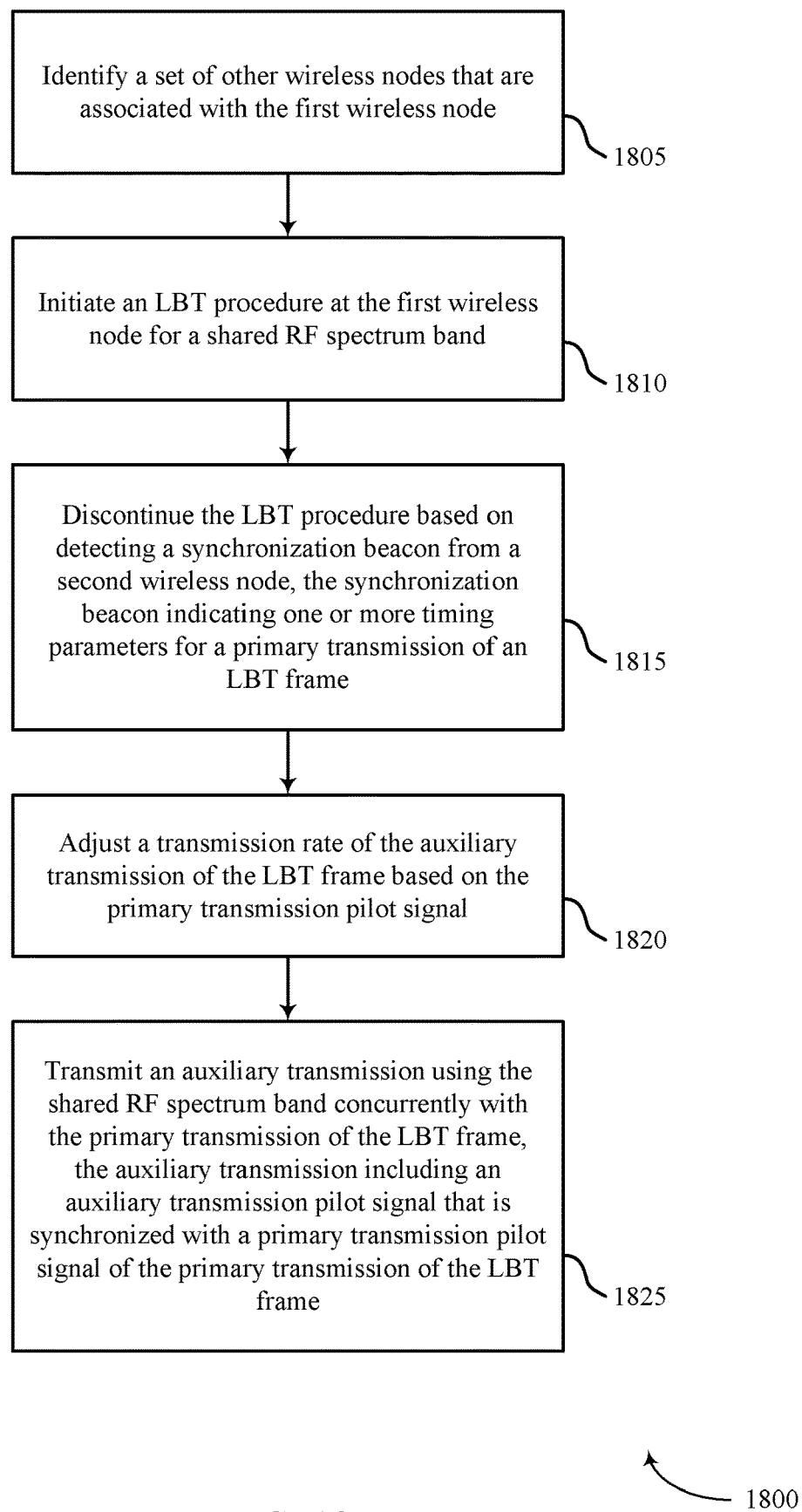

FIG. 18 shows a flowchart illustrating a method 1800 for synchronization across transmitting nodes using a shared radio frequency spectrum in accordance with various aspects of the present disclosure. The operations of method 1800 may be implemented by a device such as a UE 115 or base station 105 or its components as described with reference to FIGS. 1-12. For example, the operations of method 1800 may be performed by the synchronization manager as described herein. In some examples, the UE 115 or base station 105 may execute a set of codes to control the functional elements of the device to perform the functions described below. Additionally or alternatively, the UE 115 or base station 105 may perform aspects of the functions described below using special-purpose hardware.

At block 1805, the UE 115 or base station 105 may be a first wireless node and may identify a set of other wireless nodes that are associated with the first wireless node as described above with reference to FIGS. 2-7. In certain examples, the operations of block 1805 may be performed by the node identifying component as described with reference to FIGS. 9 and 10.

At block 1810, the UE 115 or base station 105 may initiate an LBT procedure for a shared RF spectrum band as described above with reference to FIGS. 2-7. In certain examples, the operations of block 1810 may be performed by the LBT component as described with reference to FIGS. 9 and 10.

At block 1815, the UE 115 or base station 105 may discontinue the LBT procedure based on detecting a synchronization beacon from a second wireless node, the synchronization beacon indicating one or more timing parameters for a primary transmission of an LBT frame as described above with reference to FIGS. 2-7. In certain examples, the operations of block 1815 may be performed by the LBT component as described with reference to FIGS. 9 and 10.

At block 1820, the UE 115 or base station 105 may adjust a transmission rate of the auxiliary transmission of the LBT frame based on the primary transmission pilot signal as described above with reference to FIGS. 2-7. In certain examples, the operations of block 1820 may be performed by the transmission rate component as described with reference to FIGS. 9 and 10.

At block 1825, the UE 115 or base station 105 may transmit an auxiliary transmission using the shared RF spectrum band concurrently with the primary transmission of the LBT frame, the auxiliary transmission including an auxiliary transmission pilot signal that is synchronized with a primary transmission pilot signal of the primary transmission of the LBT frame as described above with reference to FIGS. 2-7. In certain examples, the operations of block 1825 may be performed by the auxiliary transmission component as described with reference to FIGS. 9 and 10.

Figure 19:
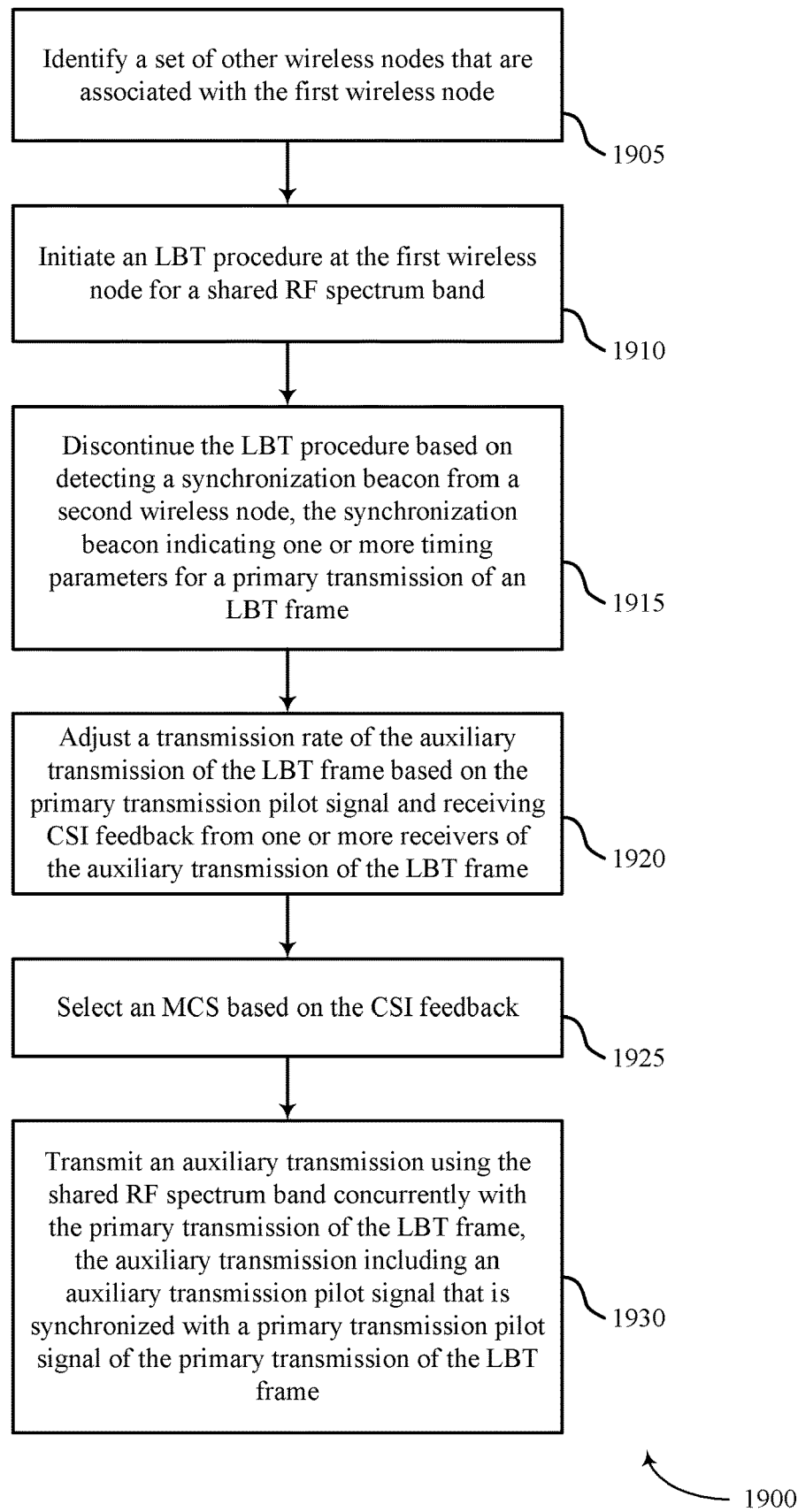

FIG. 19 shows a flowchart illustrating a method 1900 for synchronization across transmitting nodes using a shared radio frequency spectrum in accordance with various aspects of the present disclosure. The operations of method 1900 may be implemented by a device such as a UE 115 or base station 105 or its components as described with reference to FIGS. 1-12. For example, the operations of method 1900 may be performed by the synchronization manager as described herein. In some examples, the UE 115 or base station 105 may execute a set of codes to control the functional elements of the device to perform the functions described below. Additionally or alternatively, the UE 115 or base station 105 may perform aspects of the functions described below using special-purpose hardware.

At block 1905, the UE 115 or base station 105 may be a first wireless node and may identify a set of other wireless nodes that are associated with the first wireless node as described above with reference to FIGS. 2-7. In certain examples, the operations of block 1905 may be performed by the node identifying component as described with reference to FIGS. 9 and 10.

At block 1910, the UE 115 or base station 105 may initiate an LBT procedure for a shared RF spectrum band as described above with reference to FIGS. 2-7. In certain examples, the operations of block 1910 may be performed by the LBT component as described with reference to FIGS. 9 and 10.

At block 1915, the UE 115 or base station 105 may discontinue the LBT procedure based on detecting a synchronization beacon from a second wireless node, the synchronization beacon indicating one or more timing parameters for a primary transmission of an LBT frame as described above with reference to FIGS. 2-7. In certain examples, the operations of block 1915 may be performed by the LBT component as described with reference to FIGS. 9 and 10.

At block 1920, the UE 115 or base station 105 may adjust a transmission rate of the auxiliary transmission of the LBT frame based on the primary transmission pilot signal as described above with reference to FIGS. 2-7. In some cases, the adjusting includes: receiving CSI feedback from one or more receivers of the auxiliary transmission of the LBT frame. In certain examples, the operations of block 1920 may be performed by the transmission rate component as described with reference to FIGS. 9 and 10.

At block 1925, the UE 115 or base station 105 may select an MCS based on the CSI feedback as described above with reference to FIGS. 2-7. In certain examples, the operations of block 1925 may be performed by the MCS component as described with reference to FIGS. 9 and 10.

At block 1930, the UE 115 or base station 105 may transmit an auxiliary transmission using the shared RF spectrum band concurrently with the primary transmission of the LBT frame, the auxiliary transmission including an auxiliary transmission pilot signal that is synchronized with a primary transmission pilot signal of the primary transmission of the LBT frame as described above with reference to FIGS. 2-7. In certain examples, the operations of block 1930 may be performed by the auxiliary transmission component as described with reference to FIGS. 9 and 10.

It should be noted that these methods describe possible implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for synchronization across transmitting nodes using shared radio frequency spectrum.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as code division multiple access (CDMA), time division multiple access (TDMA), FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or CC associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for synchronization across transmitting nodes using shared radio frequency spectrum. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

What is claimed is:

1. A method for wireless communication, comprising:
    identifying, at a first wireless node, a set of other wireless nodes that are associated with the first wireless node;
    initiating a listen-before-talk (LBT) procedure at the first wireless node for a shared radio frequency spectrum band;
    discontinuing the LBT procedure based at least in part on detecting a second wireless node of the set of other wireless nodes transmitting an LBT frame, wherein the discontinuing comprises:
        detecting an LBT frame preamble of the second wireless node;
        identifying the second wireless node as being included in the set of other wireless nodes based at least in part on the LBT frame preamble; and
        determining that the second wireless node allows auxiliary transmissions during the LBT frame; and
    transmitting, by the first wireless node, an auxiliary transmission during the LBT frame of the detected second wireless node using the shared radio frequency spectrum band concurrently with a transmission of the detected second wireless node.

2. The method of claim 1, further comprising:
    adjusting one or more parameters of a subsequent LBT procedure performed at the first wireless node based at least in part on the auxiliary transmission.

3. The method of claim 2, wherein the one or more parameters comprise one or more of a contention window parameter, an upper bound for a contention window that is selected to be larger than an upper bound that would be selected in an absence of the auxiliary transmission, a lower bound for the contention window that is selected to be larger than a lower bound that would be selected in an absence of the auxiliary transmission, or a counter parameter associated with the subsequent LBT procedure.

4. The method of claim 2, wherein the adjusting comprises:
determining a time duration of the auxiliary transmission;
resuming the discontinued LBT procedure when the time duration of the auxiliary transmission is less than a threshold time value; and
initiating a new LBT procedure when the time duration of the auxiliary transmission is equal to or greater than the threshold time value.

5. The method of claim 4, wherein a contention window for the new LBT procedure is selected based at least in part on the time duration of the auxiliary transmission, a number of wireless nodes having transmissions that are detected at the first wireless node, or a combination thereof.

6. The method of claim 1, wherein the identifying the set of other wireless nodes comprises:
identifying one or more other wireless nodes associated with a same operator as an operator of the first wireless node; and
including one or more of the other wireless nodes associated with a same operator in the set of other wireless nodes based on one or more coexistence parameters.

7. The method of claim 6, wherein the including one or more of the other wireless nodes associated with a same operator in the set of other wireless nodes based on the one or more coexistence parameters comprises:
identifying a first number of wireless nodes having transmissions that are detected at the first wireless node;
identifying a second number of wireless nodes having transmissions that are detected at the second wireless node; and
including the second wireless node in the set of other wireless nodes based at least in part on the first number of wireless nodes and the second number of wireless nodes.

8. The method of claim 7, wherein the second wireless node is included in the set of other wireless nodes when the second number of wireless nodes exceeds the first number of wireless nodes.

9. The method of claim 6, wherein the one or more coexistence parameters comprises a probability parameter, and wherein including one or more of the other wireless nodes associated with a same operator in the set of other wireless nodes is based at least in part on the probability parameter.

10. The method of claim 9, wherein the probability parameter is adjusted to provide a higher probability of including the second wireless node in the set of other wireless nodes when the second number of wireless nodes exceeds the first number of wireless nodes.

11. The method of claim 6, wherein the one or more coexistence parameters comprises an energy detection threshold.

12. The method of claim 1, further comprising:
providing information related to other wireless nodes detected by the first wireless node with one or more wireless nodes of the set of other wireless nodes; and
receiving information related to other wireless nodes detected by one or more wireless nodes of the set of other wireless nodes.

13. The method of claim 12, wherein the providing and receiving are performed using either wireless transmissions between nodes of the set of other wireless nodes or wired connections between nodes of the set of other wireless nodes.

14. The method of claim 12, wherein the providing and receiving are performed using one or more periodic beacon signals transmitted between nodes of the set of other wireless nodes.

15. The method of claim 1, wherein the determining that the second wireless node allows auxiliary transmissions during the LBT frame comprises:
determining whether an auxiliary transmission prohibited flag is set by the second wireless node.

16. A method for wireless communication, comprising:
identifying, at a first wireless node, a set of other wireless nodes that are associated with the first wireless node;
initiating a listen-before-talk (LBT) procedure at the first wireless node for a shared radio frequency spectrum band;
discontinuing the LBT procedure based at least in part on detecting a second wireless node of the set of other wireless nodes transmitting an LBT frame, wherein discontinuing the LBT procedure further comprises detecting a synchronization beacon from the second wireless node, the synchronization beacon indicating one or more timing parameters for the LBT frame transmitted by the detected second wireless node; and
transmitting, by the first wireless node, an auxiliary transmission during the LBT frame of the detected second wireless node using the shared radio frequency spectrum band concurrently with a transmission of the detected second wireless node, wherein transmitting the auxiliary transmission comprises transmitting an auxiliary transmission pilot signal that is synchronized with a primary transmission pilot signal of the LBT frame transmitted by the detected second wireless node.

17. The method of claim 16, wherein transmitting the auxiliary transmission further comprises:
transmitting, after detecting the synchronization beacon, a channel usage beacon signal (CUBS); and
transmitting the auxiliary transmission pilot signal after the CUBS.

18. The method of claim 16, wherein transmitting the auxiliary transmission further comprises:
transmitting, after detecting the synchronization beacon, the auxiliary transmission pilot signal; and
transmitting a channel usage beacon signal (CUBS) after the auxiliary transmission pilot signal.

19. The method of claim 16, wherein transmitting the auxiliary transmission further comprises:
precoding the auxiliary transmission pilot signal according to a precoding that is to be used for data transmissions of the auxiliary transmission.

20. The method of claim 1, further comprising:
adjusting a transmission rate of the auxiliary transmission based at least in part on a primary transmission pilot signal of the LBT frame transmitted by the detected second wireless node.

21. The method of claim 20, wherein the adjusting comprises:
receiving channel state information (CSI) feedback from one or more receivers of the auxiliary transmission of the LBT frame; and
selecting a modulation and coding scheme (MCS) based at least in part on the CSI feedback.

22. An apparatus for wireless communication, comprising:
a processor;
memory in communication with the processor; and
instructions stored in the memory and operable, when executed by the processor, to cause the apparatus to:
identify, at a first wireless node, a set of other wireless nodes that are associated with the first wireless node;
initiate a listen-before-take (LBT) procedure at the first wireless node for a shared radio frequency spectrum band;
discontinue the LBT procedure based at least in part on detecting a second wireless node of the set of other wireless nodes transmitting an LBT frame, wherein, to discontinue the LBT procedure, the instructions are executable by the processor to cause the apparatus to,
detect an LBT frame preamble of the second wireless node;
identifying the second wireless node as being included in the set of other wireless nodes based at least in part on the LBT frame preamble; and
determining that the second wireless node allows auxiliary transmissions during the LBT frame; and
transmitting, by the first wireless node, an auxiliary transmission during the LBT frame of the detected second wireless node using the shared radio frequency spectrum band concurrently with a transmission of the second wireless node associated with the detected second wireless node.

23. The apparatus of claim 22, wherein the instructions are executable by the processor to cause the apparatus to:
adjust one or more parameters of a subsequent LBT procedure performed at the first wireless node based at least in part on the auxiliary transmission.

24. The apparatus of claim 23, wherein the one or more parameters comprise one or more of a contention window parameter, an upper bound for a contention window that is selected to be larger than an upper bound that would be selected in an absence of the auxiliary transmission, a lower bound for the contention window that is selected to be larger than a lower bound that would be selected in an absence of the auxiliary transmission, or a counter parameter associated with the subsequent LBT procedure.

25. The apparatus of claim 23, wherein, to adjust, the instructions are executable by the processor to cause the apparatus to:
determine a time duration of the auxiliary transmission;
resume the discontinued LBT procedure when the time duration of the auxiliary transmission is less than a threshold time value; and
initiate a new LBT procedure when the time duration of the auxiliary transmission is equal to or greater than the threshold time value.

26. The apparatus of claim 25, wherein a contention window for the new LBT procedure is selected based at least in part on the time duration of the auxiliary transmission, a number of wireless nodes having transmissions that are detected at the first wireless node, or a combination thereof.

27. An apparatus for wireless communication, comprising:
a processor;
memory in communication with the processor; and
instructions stored in the memory and operable, when executed by the processor, to cause the apparatus to:
identify, at a first wireless node, a set of other wireless nodes that are associated with the first wireless node;
initiate a listen-before-take (LBT) procedure at the first wireless node for a shared radio frequency spectrum band;
discontinue the LBT procedure based at least in part on detecting a second wireless node of the set of other wireless nodes transmitting an LBT frame, wherein to discontinue the LBT procedure, the instructions are executable by the processor to cause the apparatus to detect a synchronization beacon from the second wireless node, the synchronization beacon indicating one or more timing parameters for the LBT frame transmitted by the detected second wireless node; and
transmit, by the first wireless node, an auxiliary transmission during the LBT frame of the detected second wireless node using the shared radio frequency spectrum hand concurrently with a transmission of the detected second wireless node, wherein the instructions are executable by the processor to cause the apparatus to transmit an auxiliary transmission pilot signal that is synchronized with a primary transmission pilot signal of the LBT frame transmitted by the detected second wireless node.

28. The apparatus of claim 27, wherein, to transmit the auxiliary transmission, the instructions are executable by the processor to cause the apparatus to:
transmit, after detecting the synchronization beacon, a channel usage beacon signal (CUBS); and
transmit the auxiliary transmission pilot signal after the CUBS.

29. The apparatus of claim 27, wherein, to transmit the auxiliary transmission, the instructions are executable by the processor to cause the apparatus to:
transmit, after detecting the synchronization beacon, the auxiliary transmission pilot signal; and
transmit a channel usage beacon signal (CUBS) after the auxiliary transmission pilot signal.

30. The apparatus of claim 27, wherein, to transmit the auxiliary transmission, the instructions are executable by the processor to cause the apparatus to:
precode the auxiliary transmission pilot signal according to a precoding that is to be used for data transmissions of the auxiliary transmission.

* * * * *